(12) United States Patent
Suski

(10) Patent No.: US 12,147,512 B2
(45) Date of Patent: Nov. 19, 2024

(54) GENERATING AUTHENTICATION TEMPLATE FILTERS USING ONE OR MORE MACHINE-LEARNED MODELS

(71) Applicant: Applied Engineering Concepts, Inc., Eldersburg, MD (US)

(72) Inventor: William Charles Suski, Mount Pleasant, SC (US)

(73) Assignee: Applied Engineering Concepts, Inc., Eldersburg, MD (US)

( * ) Notice: Subject to any disclaimer, the term of this patent is extended or adjusted under 35 U.S.C. 154(b) by 361 days.

(21) Appl. No.: 17/826,654

(22) Filed: May 27, 2022

(65) Prior Publication Data

US 2023/0035291 A1 Feb. 2, 2023

Related U.S. Application Data

(60) Provisional application No. 63/227,712, filed on Jul. 30, 2021.

(51) Int. Cl.
*G06F 21/31* (2013.01)
*G06N 20/00* (2019.01)

(52) U.S. Cl.
CPC ............. *G06F 21/31* (2013.01); *G06N 20/00* (2019.01)

(58) Field of Classification Search
CPC ................................ G06F 21/31; G06N 20/00
See application file for complete search history.

(56) References Cited

U.S. PATENT DOCUMENTS

| | | | |
|---|---|---|---|
| 11,227,036 B1* | 1/2022 | Hitchcock | G06F 21/40 |
| 11,915,503 B2* | 2/2024 | Ross | G06T 1/0064 |
| 11,983,957 B2* | 5/2024 | Shannon | G06T 7/60 |
| 2018/0137329 A1* | 5/2018 | Kim | G06V 10/50 |
| 2020/0382492 A1* | 12/2020 | Kalaboukis | H04L 63/107 |
| 2021/0319339 A1* | 10/2021 | Rawat | G06N 3/08 |
| 2021/0326467 A1* | 10/2021 | Levy | H04L 41/20 |
| 2021/0406772 A1* | 12/2021 | Shillingford | G06F 40/169 |
| 2022/0086131 A1* | 3/2022 | Kinai | G06N 20/00 |
| 2023/0217308 A1* | 7/2023 | Sandberg | H04L 41/16 370/235 |
| 2023/0274527 A1* | 8/2023 | Chen | G06F 18/214 382/181 |
| 2023/0297852 A1* | 9/2023 | Zhang | G06N 5/022 706/46 |
| 2024/0095100 A1* | 3/2024 | Pateromichelakis | G06F 9/541 |

* cited by examiner

*Primary Examiner* — Viral S Lakhia
(74) *Attorney, Agent, or Firm* — Dority & Manning, P.A.

(57) ABSTRACT

Systems and methods for computing device authentication can involve template matching with an authentication filter. Authentication filters can be generated by using an authentication model to determine or generate templates for authenticated classes. For example, simulated signal data sets can be input into the authentication model until an authenticated class classification is output. The successful simulated signal data set may then be used to generate or update an authentication filter that uses the template for template matching authentication classification.

18 Claims, 15 Drawing Sheets

GENERATING AUTHENTICATION TEMPLATE FILTERS USING ONE OR MORE MACHINE-LEARNED MODELS

RELATED APPLICATIONS

This application claims priority to and the benefit of U.S. Provisional Patent Application No. 63/227,712, filed Jul. 30, 2021. U.S. Provisional Patent Application No. 63/227,712 is hereby incorporated by reference in its entirety.

FEDERAL RESEARCH STATEMENT

This invention was made with Government support under Contract No. DE-SC0019922, awarded by the U.S. Department of Energy. The Government has certain rights in the invention.

FIELD

The present disclosure relates generally to electronic communication networks. More particularly, the present disclosure relates to security and/or authentication of electronic communications networks.

BACKGROUND

Communication networks can allow computing devices to communicate using a variety of protocols. Network systems can authenticate (e.g., identify) computing devices on a network. Networks can include information technology (IT) networks and operational technology (OT) networks. Networks can define a distribution, with individual devices categorizable as "in-distribution" (ID) or "out-of-distribution" (OOD).

The Open Systems Interconnection (OSI) model represents network systems as a collection of seven layers. Layer 1 is the physical layer, corresponding to, for instance, transmission and reception of raw bit streams over a physical medium. Layer 2 is the data link layer, corresponding to, for instance, transmission of data frames between two nodes connected by a physical layer. Layer 3 is the network layer, corresponding to, for instance, structuring and managing a multi-node network, including, for example, addressing, routing and traffic control. Layer 4 is the transport layer, corresponding to, for instance, reliable transmission of data segments between points on a network, including, for example, segmentation, acknowledgement, and multiplexing. Layer 5 is the session layer, corresponding to, for instance, managing communication sessions (i.e., continuous exchange of information in the form of multiple back-and-forth transmissions between two nodes). Layer 6 is the presentation layer, corresponding to, for instance, translation of data between a networking service and an application, including, for example, character encoding, data compression and encryption/decryption. Layer 7 is the application layer, corresponding to, for instance, high-level APIs, including, for example, resource sharing and remote file access.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system including one or more processors, a trained authentication model. In some implementations, the trained authentication model can be trained to classify a computing device based on signal data. The method can include determining, by the computing system, an input that the trained authentication model classifies as an authenticated class. In some implementations, the authenticated class can be descriptive of authenticated signal data associated with an authenticated computing device. The method can include generating, by the computing system, an authentication filter based on the input and storing, by the computing system, the authentication filter for classification.

In some implementations, the method can include processing, by the computing system, input signal data with the authentication filter to determine an authentication classification for the input signal data. The method can include adjusting, by the computing system, network access for a computing device based on the authentication classification, and the input signal data can be generated by the computing device. The trained authentication model can be trained based on labeled signal data. In some implementations, determining, by the computing system, the input that the trained authentication model classifies as the authenticated class can include generating, by the computing system, example signal data with an input model. The input model can include generative neural network.

In some implementations, the input model can be trained by: generating, by the computing system, training signal data with the input model; processing, by the computing system, the training signal data with the trained authentication model to generate an authentication classification; evaluating, by the computing system, a loss function that evaluates a difference between the authentication classification and the authentication class; and adjusting, by the computing system, one or more parameters of the input model based at least in part on the loss function. In some implementations, the input model can include an autoencoder. The input model can include a long short-term memory model. In some implementations, the input model can be trained to determine one or more features the trained authentication model uses for authentication classification and generate the input based on the one or more features. Determining, by the computing system, the input that the trained authentication model classifies as the authenticated class can include at least one of black box optimization, randomized signal generation, training a machine-learned model, or a genetic algorithm.

Another example aspect of the present disclosure is directed to a computing system for network authentication. The system can include one or more sensors configured to collect a plurality of physical signal samples associated with physical communication signals of a device on a network and one or more non-transitory computer-readable media. The one or more non-transitory computer-readable media can collectively store an authentication filter generated based on one or more classification parameters for a trained authentication model. In some implementations, the authentication filter can include data descriptive of authenticated signal data. The authentication filter can be configured to determine an authentication classification, and the authentication classification can be determined based at least in part on if obtained signal data is associated with one or more authenticated computing devices. The system can include a controller configured to control one or more ports of a network switch or router of the network based on the authentication classification for the device.

In some implementations, the one or more non-transitory computer-readable media can store a second authentication filter generated based on one or more second classification parameters for the trained authentication model. The second authentication filter can include data descriptive of second authenticated signal data. In some implementations, the second authentication filter can be configured to determine if obtained signal data is associated with one or more second authenticated computing devices. The authenticated signal data can include data with one or more features determined to match one or more authenticated features of the one or more authenticated computing devices.

Another example aspect of the present disclosure is directed to one or more non-transitory computer readable media that collectively store instructions that, when executed by one or more processors, cause a computing system to perform operations. The operations can include obtaining a trained authentication model. The trained authentication model can be trained to classify a computing device based on signal data. In some implementations, the operations can include generating training signal data with an input model and processing the training signal data with the trained authentication model to generate an authentication classification. The operations can include evaluating a loss function that evaluates a difference between the authentication classification and an authenticated class. In some implementations, the authenticated class can be associated with authenticated signal data generated by an authenticated computing device. The operations can include adjusting one or more parameters of the input model based at least in part on the loss function.

In some implementations, the operations can include determining an input that the trained authentication model classifies as the authenticated class. The authenticated class can be descriptive of the authenticated signal data associated with the authenticated computing device. The operations can include generating an authentication filter based on the input and storing the authentication filter for classification. In some implementations, a plurality of authentication filters can be generated for an input. The operations can include determining an average filter for the plurality of authentication filters and storing the average filter for classification. In some implementations, the trained authentication model can include a first machine-learned model configured to process a plurality of physical signal samples to generate a device fingerprint for a device based at least in part on the plurality of physical signal samples and a second machine-learned model configured to process the device fingerprint to generate the authentication classification for the device based at least in part on the device fingerprint.

In some implementations, the operations can include obtaining signal data. The signal data can be descriptive of a computing device. The operations can include processing the signal data with an encoder model to generate encoded signal data, determining a signal authentication classification for the encoded signal data based on the authentication filter, and adjusting network access for the computing device based on the signal authentication classification. In some implementations, the trained authentication model can include a trained classification model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
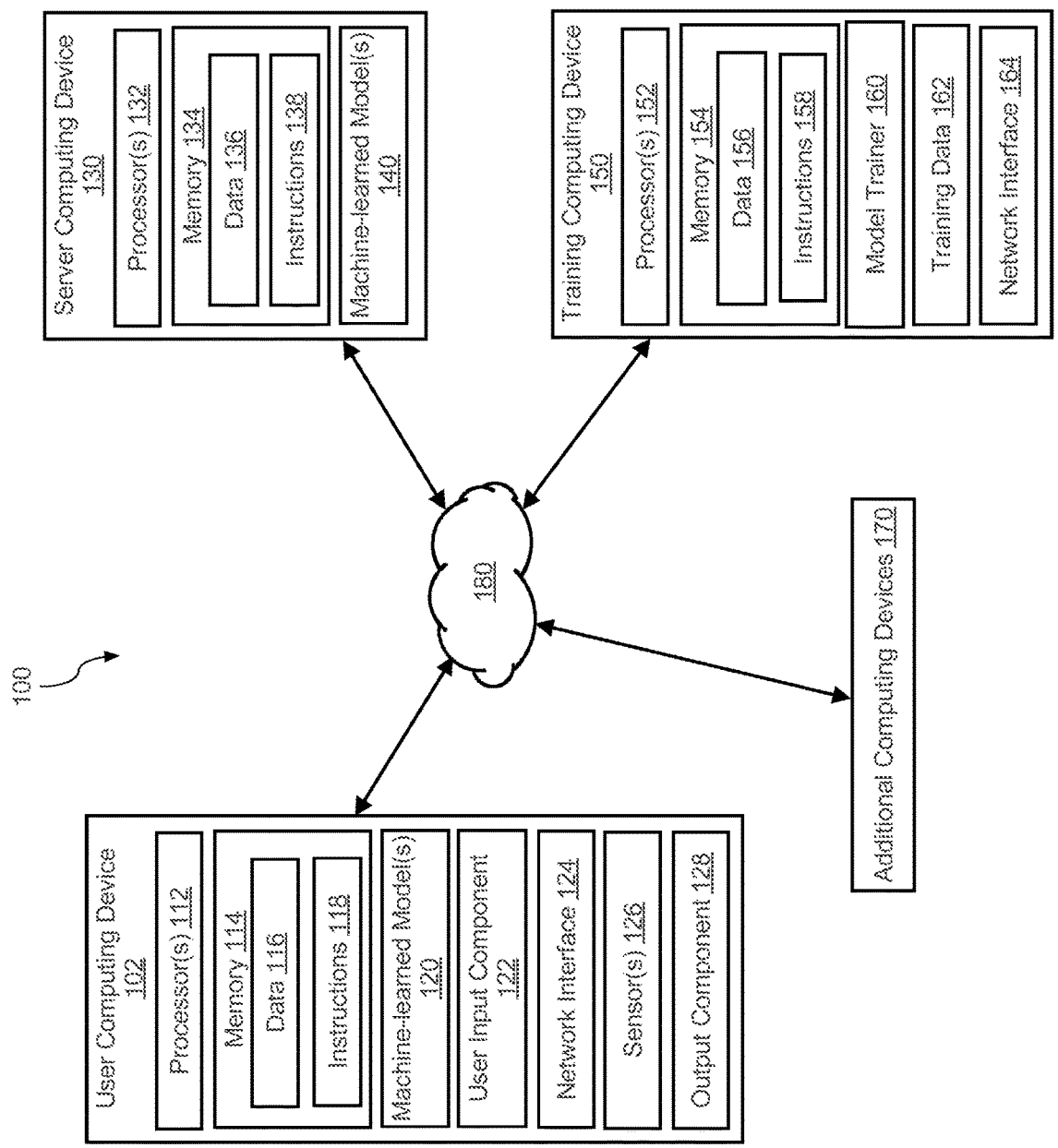
FIG. 1A depicts a block diagram of an example computing system that performs authentication filter generation according to example embodiments of the present disclosure.

Reference numerals that are repeated across plural figures are intended to identify the same features in various implementations.

DETAILED DESCRIPTION

Overview

Generally, the present disclosure is directed to systems and methods for generating authentication filters for use in authentication classification of computing devices. The systems and methods can leverage one or more machine-learned models to generate templates, which can simulate authenticated signal data. The one or more templates can be used to generate one or more authentication filters, which can then be utilized for authentication classification. For example, input signal data can be processed with the authentication filter to generate an authentication classification. If the input signal data matches or is associated with the template of the authentication filter, then the authentication classification may be an in-distribution computing device. If the input signal data does not match or is not associated with the template of the authentication filter, then the authentication classification may be an out-of-distribution computing device. Network access for the computing device that generated the input signal data can then be adjusted based on the authentication classification. For example, an in-distribution classification, or authenticated class, can cause the network access to be unrestricted, while an out-of-distribution classification, or unauthenticated class, can cause the network access to be restricted or closed.

The systems and methods disclosed herein can include obtaining a trained authentication model. The trained authentication model can be trained to classify a computing device based on signal data. The systems and methods can determine an input that the trained authentication model classifies as an authenticated class. The authenticated class can be an authentication classification descriptive of authenticated signal data associated with an authenticated computing device. The input can then be used to generate an authentication filter. The authentication filter can be stored for future authentication classification. The authentication filter can be stored locally on a port switch, a network controller, or another computing device. In some implementations, the authentication filter can be stored in the cloud or on a centralized server computing device.

The stored authentication filter can be used to process input signal data to determine an authentication classification for the input signal data. The authentication classification can then be used to adjust the network access for a computing device. The computing device can be the device that generated the input signal data. The network access may be adjusted to provide unrestricted access in response to an authenticated class classification or may be adjusted to provide restricted or closed access in response to an unauthenticated class classification.

The authentication classification may be determined based on whether the input signal data matches or is associated with a template of the authentication filter. The template can include the input determined to be associated with an authenticated class.

Obtaining the trained authentication model can involve retrieving the machine-learned model from a server computing system or may involve training an authentication model to process physical signal data and output an authentication classification. The authentication model can include a first machine-learned model configured to process a plurality of physical signal samples to generate a device fingerprint for a device based at least in part on the plurality of physical signal samples and a second machine-learned model configured to process the device fingerprint to generate the authentication classification for the device based at least in part on the device fingerprint. The authentication model can be trained based on labeled signal data. For example, a plurality of training signal data samples can include a plurality of training signal data sets and respective labels for each respective training signal data sets. The labels can include authenticated class or unauthenticated class. Alternatively and/or additionally, the systems and methods can have a spectrum of authentication classifications with varying network access.

Determining an input that the trained authentication model classifies as the authenticated class can involve brute force determination by generating randomized signal data and processing the generated signal data with the trained authentication model until an authenticated class output occurs. Alternatively and/or additionally, determining the input can include training an input model to generate example signal data.

The input model can include an autoencoder. In some implementations, the input model can include a long short-term memory model and/or a generative neural network. The input model may be trained with a loss function. For example, the input model can generate training signal data. The training signal data can then be processed with the trained authentication model to generate an authentication classification. The authentication classification can be used to evaluate the loss function by evaluating the difference between the authentication classification and an authenticated class. One or more parameters of the input model can be adjusted based on the loss function. The input model can be trained to output one or more signal data templates, wherein the input includes the one or more signal data templates. The input model can be trained to trick the authentication model to output an authenticated class classification. The training can involve the use of a standard classification loss function.

Additionally and/or alternatively, the input model can be trained to determine one or more features the trained authentication model uses for authentication classification and generate the input based on the one or more features.

In some implementations, determining the input that the trained authentication model classifies as the authenticated class can include black box optimization.

Generating an authentication filter can include processing the input to generate a template to be used to compare input signal data to, in order to generate authentication classifications. In some implementations, a plurality of authentication filters can be generated for each input, and the plurality of authentication filters can be averaged to generate an average filter to be used for authentication classification. An authentication filter can be generated for each authenticated computing device for the network. Alternatively, a single authentication filter may be able to filter signal data for a plurality of authenticated computing devices in an authenticated class by storing a plurality of templates for a plurality of respective authenticated computing devices.

In some implementations the authentication filter can be generated based on one or more classification parameters for a trained authentication model. The authentication filter can include data descriptive of authenticated signal data. Moreover, the authentication filter can be configured to determine an authentication classification. The authentication classification can be determined based at least in part on if obtained signal data is associated with one or more authenticated computing devices. The authentication filter can include data with one or more features determined to match one or more authenticated features of the one or more authenticated computing devices.

The authentication filter can be generated using a standard correlation process with one or more templates. For example, the input can include a template for generating an authenticated class output. The template can be processed to generate the authentication filter and/or be part of the authentication filter. The authentication filter can include a plurality of templates for a plurality of respective known devices. Therefore, the authentication filter can classify signal data for a plurality of known computing devices.

In some implementations, a genetic algorithm system can be used to generate simulated signal data to be used to determine the input. The determined input can then be used to generate the authentication filter. Alternatively and/or additionally, brute force testing and/or another approach may be used to determine an input, or template.

Storing an authentication filter can involve storing the authentication filter in one or more non-transitory computer-readable media. The authentication filter can be stored locally in a port switch device, a network controller device, or a personal computing device. Alternatively and/or additionally, the authentication filter can be stored on a server computing system.

Once generated, the authentication filter can be deployed to port switch devices and/or network controller devices. The authentication filter can be updated and/or adjusted as more templates, or inputs, are determined and/or generated.

Processing input signal data with the authentication filter can include obtaining input signal data from a computing device. The input signal data can be processed with an encoder model to generate encoded signal data. The encoded signal data can then be used to determine if the computing device is part of an authenticated class based on a determined authentication classification. The authentication classification may be determined by comparing the encoded input signal data with the authentication filter. Determining the authentication classification can involve an N point correlation determination for each template of the authentication filter, and the determined authentication classification can be based on the highest correlation or association with a particular template. For example, a maximum reading for the input signal data can be a maximum reading with an authenticated computing device, and therefore, the classification can be an authenticated class classification.

Adjusting network access for a computing device can involve determining an access level associated with the authentication classification and adjusting the network access for the computing device based on the associated access level.

In some implementations, the authentication filter can include a bank of correlators associated with one or more authenticated computing devices.

The input and/or the signal data can be 10BaseT signal data. In some implementations, the input and/or the signal data can include noise. Alternatively, noise may be removed during preprocessing. In some implementations, the authentication filter can be augmented to factor in environmental noise for a particular device or environment.

The systems and methods can include one or more techniques to reduce the form factor caused by sensor data generation. The reduction of the form factor can enable embedded fingerprinting at the network edge.

In some implementations, the systems and methods can be used to remove the GPU component of the authentication classification process for port switches.

The authentication model and/or the input model can be trained locally to be deployed on local devices or may be trained generally to be deployed globally for a larger scaled approach.

Each authenticated class can be associated with a known computing device in which the trained authentication model is trained to detect. In some implementations, an unauthenticated class can be a known computing device labeled as restricted or closed access to the network. Alternatively and/or additionally, the unauthenticated class can be associated with unknown computing devices that can be provided with limited to no access to the network.

In some implementations, the authentication filter can be generated by randomly feeding data to the authentication model, tweaking the randomly input data based on the output until a satisfactory output occurs, and then using the successful input as a template which can be used to generate an authentication filter. The authentication filter can then generate authentication classifications based on correlations with the template.

In some implementations, the template can be determined by processing the trained classification parameters of the trained authentication model to determine the one or more features associated with the one or more desired classifications.

In some implementations, the authentication filter can be used to generate a device fingerprint, which can then be processed by a support vector machine model to determine the classification. Alternatively and/or additionally, the output of the authentication filter can be a classification along with a level of certainty. If the level of certainty is not above a threshold level, the classification may be rejected and the computing device may be treated as an unauthenticated computing device.

The input can be simulated signal data, or synthetic signal data. The input can be generated with a genetic algorithm, a machine-learned model with reinforcement learning, or via random generation.

The systems and methods may include a low pass high frequency filter for preprocessing of input signal data.

The systems and methods of the present disclosure provide a number of technical effects and benefits. As one example, the system and methods can provide authentication classification or filtering based on generated templates. More specifically, the systems and methods can leverage a trained authentication model to generate authentication filters that can be used to determine if signal data is indicative of an authenticated computing device. Additionally and/or alternatively, the systems and methods described herein can provide improved security within a network. For instance, it can be more difficult for OOD devices to spoof or misrepresent information to gain access to a network.

The systems and methods for authentication classification can be used as a security mechanism to send instructions to a controller to turn on or off access to a port. Authentication classification can be a first line of defense to a network and can be part of a larger scale security system that may track MAC addresses, IP addresses, and/or PKI certificates. Further security protocols can be implemented in other layers including requiring a username and password for access. The systems and methods can protect one port or a plurality of ports. The systems and methods can be applied to network access through a single port or can be applied to many access ports. For example, the systems and methods can be used to protect an entire campus of ports using a centralized stored model or template filter. In some implementations, the systems and methods may utilize block-chain to prevent fraudulent authentication. The systems and methods may be implemented as part of software-defined networking architecture.

Another technical benefit of the systems and methods of the present disclosure is the ability to train an input model to generate authentication filters, which can then be used for authentication classification. In some implementations, training the input model can include the use of a loss function that can be used to evaluate generated input signal data against authenticated signal data in order to train the input model to simulate authenticated signal data.

Another example technical effect and benefit relates to improved computational efficiency and improvements in the functioning of a computing system. For example, the systems and methods disclosed herein can leverage generated authentication filters to provide authentication classification without the computational cost of using a machine-learned model every time a device needs to be authenticated. Moreover, in some implementations, the low computing cost of matching signal data against the authentication filter can allow for authentication classification to occur locally on a port switch device without the need for expensive computing components.

With reference now to the Figures, example embodiments of the present disclosure will be discussed in further detail.

Example Devices and Systems

FIG. 1A depicts a block diagram of an example computing system 100 that performs authentication filter generation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more authentication models 120. For example, the authentication models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example authentication models 120 are discussed with reference to FIGS. 2-3 & 14A-14C.

In some implementations, the one or more authentication models 120 can be received from the server computing system 130 over network 180, stored in the user computing device memory 114, and then used or otherwise implemented by the one or more processors 112. In some implementations, the user computing device 102 can implement multiple parallel instances of a single authentication model 120 (e.g., to perform parallel authentication filter generation across multiple instances of authenticated computing devices).

More particularly, the authentication model can be used for processing signal data generated by one or more computing devices and can be used to generate an authentication classification. The authentication classification can then be used for adjusting the network access for the one or more computing devices.

The authentication model can further be used for generating authentication filters for low computing cost authentication classification tasks. For example, an input model may generate simulated signal data to be processed with the authentication model. The authentication model can then output an authentication classification. The authentication classification can be compared to an authenticated class classification to evaluate a classification loss function. One or more parameters of the input model can then be adjusted based on the classification loss function. The process can be run iteratively until an input is generated by the input model that the authentication model classifies as an authenticated class. The input can then be used to generate an authentication filter, which can be stored for low computing cost authentication classification.

Alternatively and/or additionally, the input used to generate the template filter can be determined by repeatedly generating simulated signal data until the authentication model generates an authenticated class classification.

Additionally or alternatively, one or more authentication models 140 can be included in or otherwise stored and implemented by the server computing system 130 that communicates with the user computing device 102 according to a client-server relationship. For example, the authentication models 140 can be implemented by the server computing system 140 as a portion of a web service (e.g., an authentication filter generation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned authentication models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-3, 13, & 14A—14C.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the authentication models 120 and/or 140 based on a set of training data 162. The training data 162 can include, for example, labeled training data sets. The labeled training data sets can include signal data sets and respective labels for each respective signal data set. The labels can be authentication classifications, which can be binary or a progressive scale of authentication levels.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as registering the device.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). In another example, the task may comprise generating an embedding for input data (e.g., input audio or visual data).

FIG. 1A depicts an example computing system 100 for machine-learning-based identification of device classifiers according to example implementations of the present disclosure. The example system 100 includes a computing device 102 and a machine learning computing system 130 that are communicatively coupled over a network 180.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the computing device 102 can obtain data from one or more memory device(s) that are remote from the device 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

According to an aspect of the present disclosure, the computing device 102 can store or include one or more machine-learned models 120. For example, the models 120 can be or can otherwise include various machine-learned models such as a random forest classifier; a logistic regression classifier; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

In some implementations, the computing device 102 can receive the one or more machine-learned models 120 from the server computing system 130 over network 180 and can store the one or more machine-learned models 120 in the memory 114. The computing device 102 can then use or otherwise run the one or more machine-learned models 120 (e.g., by processor(s) 112).

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the server computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the server computing system 130 includes one or more server computing devices. If the server computing system 130 includes multiple server computing devices, such server computing devices can operate according to various computing architectures, including, for example, sequential computing architectures, parallel computing architectures, or some combination thereof.

In addition or alternatively to the model(s) 120 at the computing device 102, the server computing system 130 can include one or more machine-learned models 140. For example, the models 140 can be or can otherwise include various machine-learned models such as a random forest classifier; a logistic regression classifier; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

As an example, the server computing system 130 can communicate with the computing device 102 according to a client-server relationship. For example, the server computing system 130 can implement the machine-learned models 140 to provide a web service to the computing device 102. For example, the web service can provide identification of device classifiers as a service.

Thus, machine-learned models 120 can be located and used at the computing device 102 and/or machine-learned models 140 can be located and used at the server computing system 130.

In some implementations, the server computing system 130 and/or the computing device 102 can train the machine-learned models 120 and/or 140 through use of a model trainer 160. The model trainer 160 can train the machine-learned models 120 and/or 140 using one or more training or learning algorithms. One example training technique is backwards propagation of errors ("backpropagation").

In some implementations, the model trainer 160 can perform supervised training techniques using a set of labeled training data 162, for example as described with reference to FIG. 1A. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques. The model trainer 160 can be implemented in hardware, software, firmware, or combinations thereof.

The computing device 102 can also include a network interface 124 used to communicate with one or more systems or devices, including systems or devices that are remotely located from the computing device 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the server computing system 130 can include a network interface 164.

The computing device 102 can also include one or more sensors 126. For example, the one or more sensors 126 can include any type of sensor useful to collect data about an environment of the computing device 102.

The computing device 102 can also include a user input component 122. For example, the user input component 122 can include a microphone, a keypad, a keyboard, a click-wheel, buttons, and/or a touch-sensitive screen.

The computing device 102 can also include an output component 128. For example, the output component 128 can include a speaker, a haptic output component, and/or a display (e.g., a touch-sensitive display).

As another example, the computing device 102 can transmit information to one or more additional devices 170 (e.g., network devices, etc.). The computing device 102 can communicate with the additional computing device(s) 170 over the network 180 and/or via a local, short-range wireless communication protocol (e.g., Bluetooth).

The network(s) 180 can be any type of network or combination of networks that allows for communication between devices. In some implementations, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
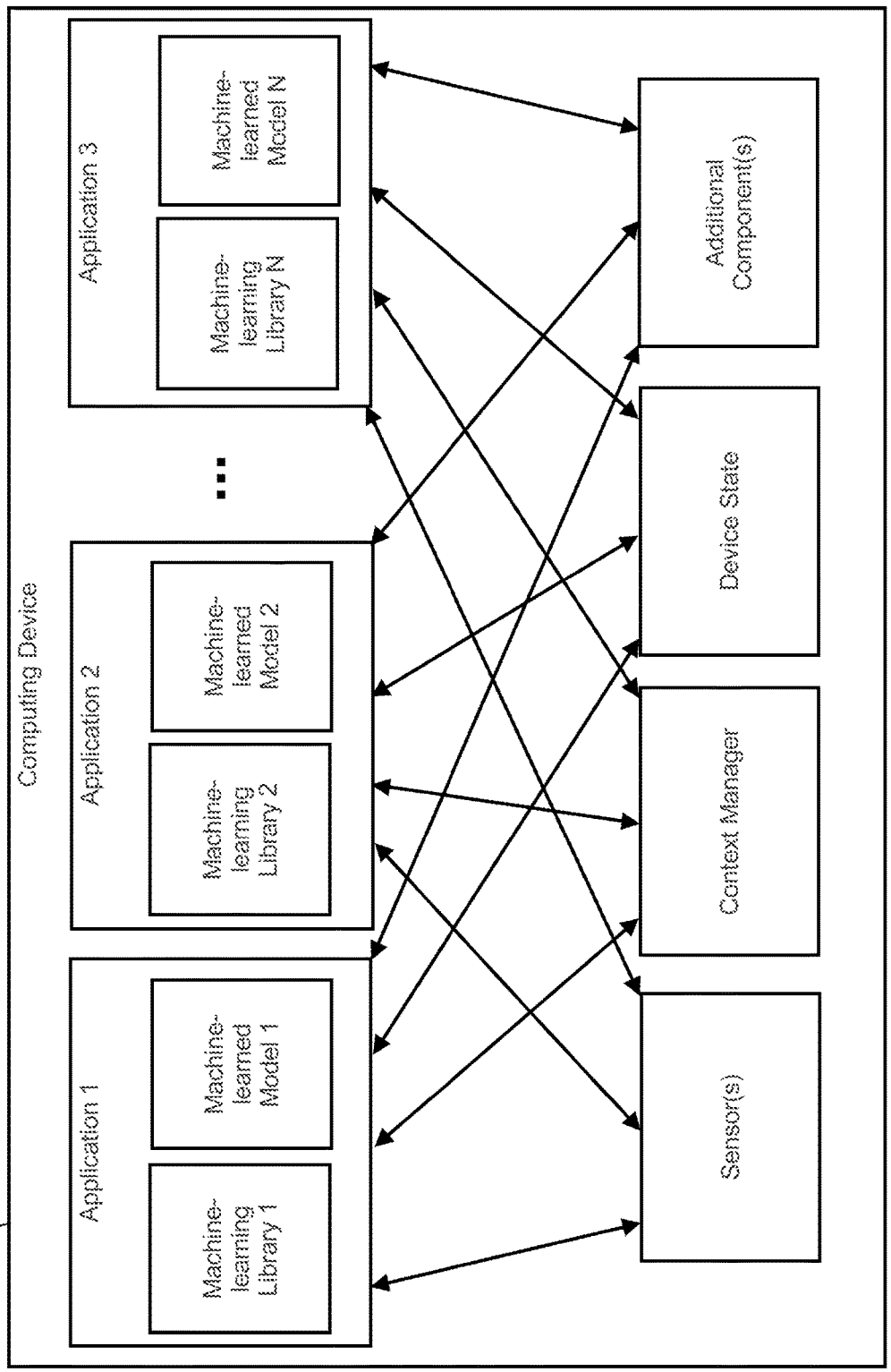
FIG. 1B depicts a block diagram of an example computing device that performs authentication filter generation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
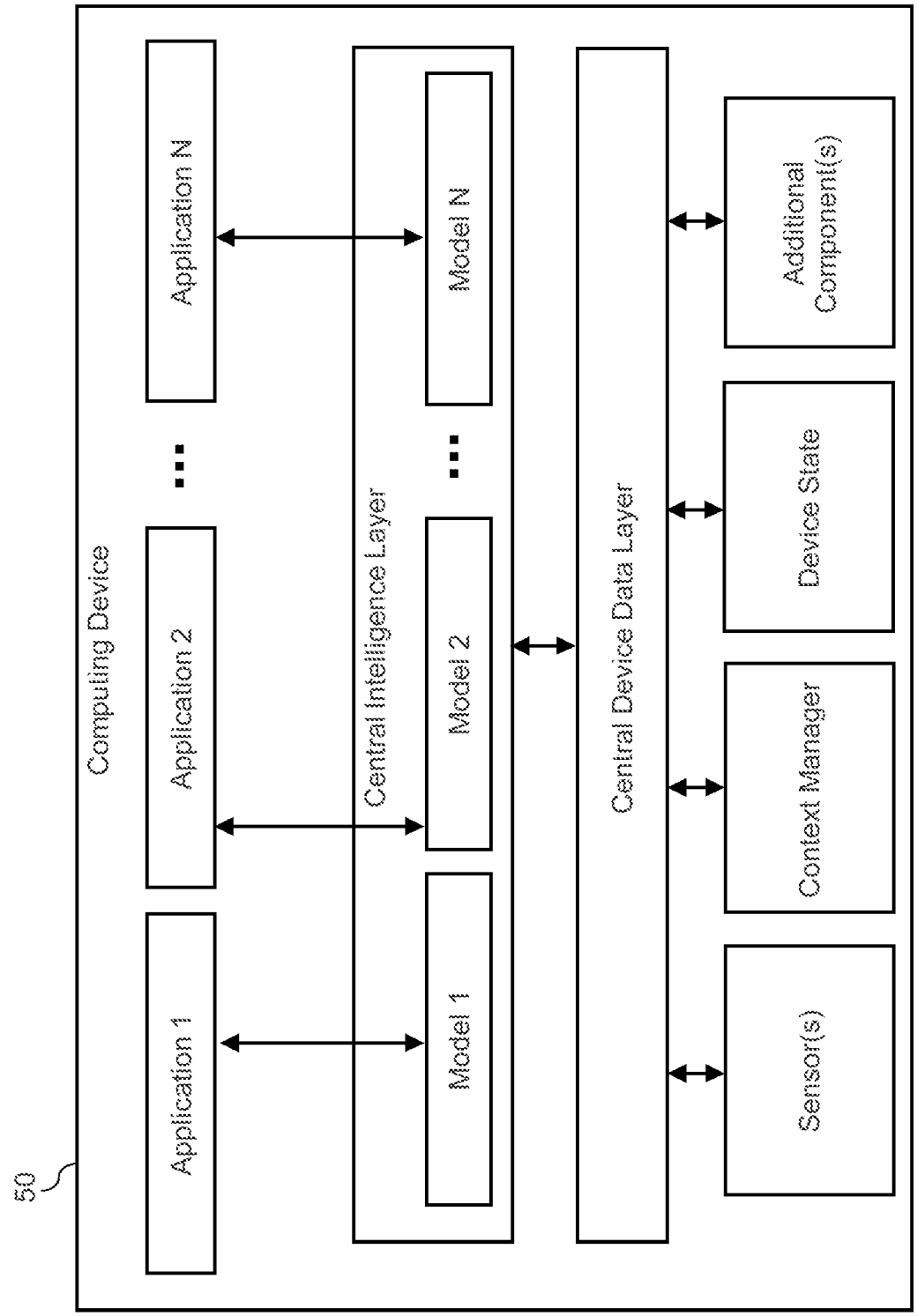
FIG. 1C depicts a block diagram of an example computing device that performs authentication filter generation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
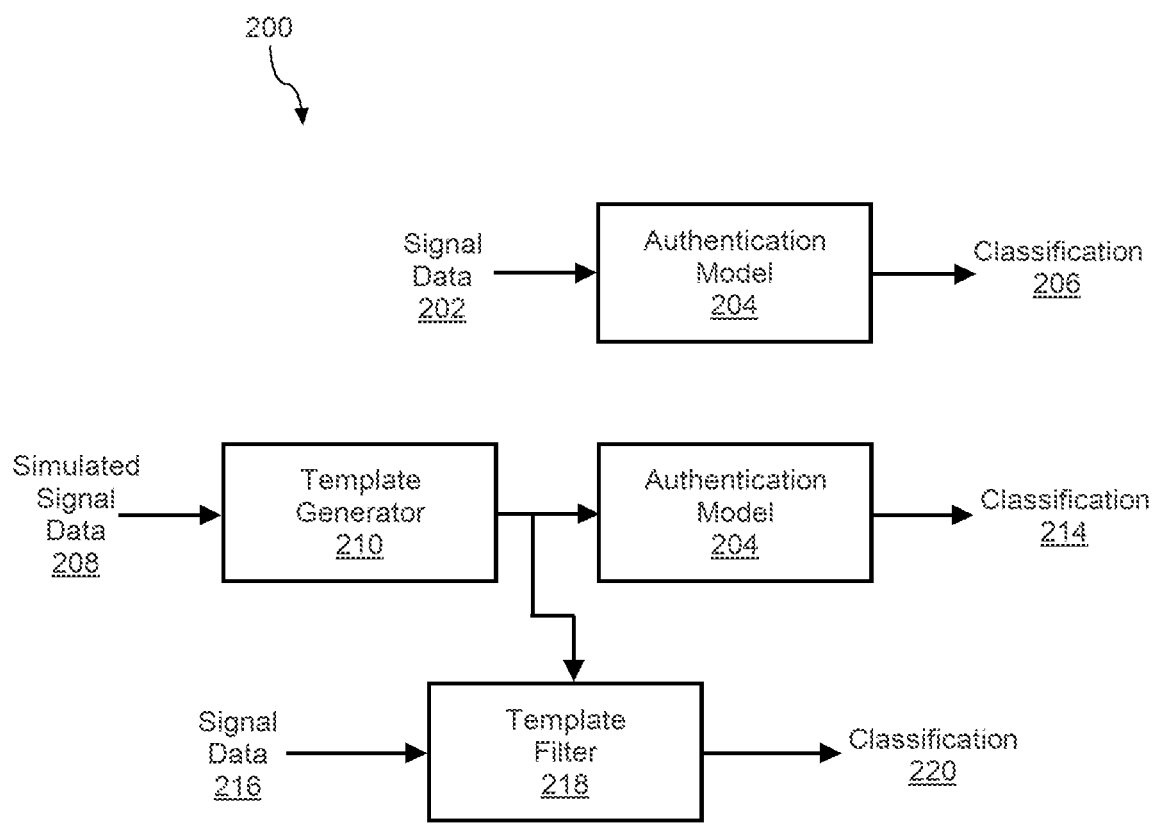
FIG. 2 depicts a block diagram of an example input model according to example embodiments of the present disclosure.

FIG. 2 depicts a block diagram of an example authentication filter generation system 200 according to example embodiments of the present disclosure. In some implementations, the authentication filter generation system 200 can include an authentication model 204 trained to receive a set of input data 202 descriptive of a particular computing device and, as a result of receipt of the input data 202, provide output data 206 and 214 that can be used to determine the source of the signal data and whether to provide network access to the source of the signal data 202. Thus, in some implementations, the authentication filter generation system 200 can include an authentication model 202 that is operable to classify computing devices based on signal data.

In some implementations, the systems and methods disclosed herein can obtain an authentication model 204. The authentication model 204 can include a first machine-learned model for processing signal data 202 to generate a device fingerprint and a second machine-learned model for processing the device fingerprint to generate an authentication classification 206, which can be descriptive of a level of computing device authentication. The authentication levels can be associated with various levels of network access, such that a fully authorized class classification may cause the network controller to provide unrestricted network access, while an unauthorized class classification may cause a network controller to provide limited or no network access to a particular computing device.

The authentication model 204 may be trained with labeled training data. In some implementations, after the authentication model is trained, the authentication model 204 can be used to generate one or more templates, that can be used to generate an authentication filter 218. Generation of the one or more templates can involve a template generator 210, or an input model. The template generator 210 can receive simulated signal data 208 to begin to learn to generate synthetic signal data. Alternatively and/or additionally, the input model can be trained by generating synthetic signal data, processing the synthetic signal data with the authentication model 204, and adjusting one or more parameters of the input model based on the classification 214 generated by the authentication model 204. Once an authenticated class classification is output, the synthetic signal data, or input, may be saved as a template. The process can be repeated to generate a plurality of templates for a plurality of classifications. The one or more templates can then be used to generate an authentication filter 218.

The authentication filter 218 can then be used for authentication classification tasks. For example, the authentication filter 218 can utilize template matching techniques to determine a classification 220. More specifically, the authentication filter 218 can process signal data 216 by determining a similarity level between the signal data 216 and each template. The template with the highest association or similarity level can then be determined as the authentication classification 220. Alternatively and/or additionally, if the similarity level does not reach a threshold similarity level, then an unauthorized class classification may be output.

Figure 3A:
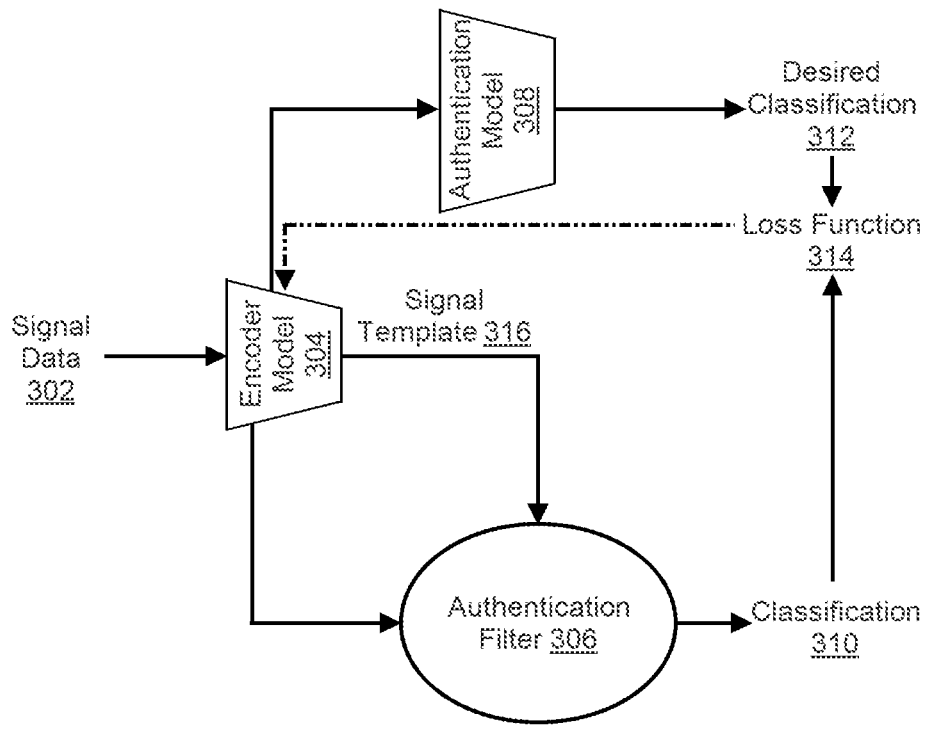
FIG. 3A depicts a block diagram of an example authentication filter process according to example embodiments of the present disclosure.
Figure 3B:
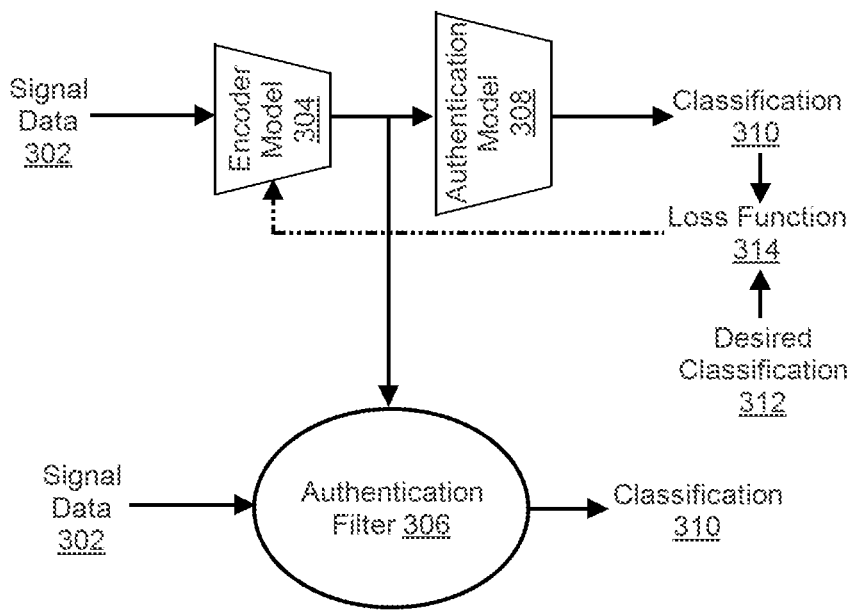
FIG. 3B depicts a block diagram of an example authentication filter process according to example embodiments of the present disclosure.

FIGS. 3A & 3B depict block diagrams of an example authentication filter generation system 300 according to example embodiments of the present disclosure. The authentication filter generation system 300 is similar to the authentication filter generation system 200 of FIG. 2 except that authentication filter generation system 300 includes an input model 304 and an authentication model 308.

In some implementations, the authentication filter generation system 300 can include the encoder model 304 and the authentication model 308, which can include a classification model (e.g., a trained MCNET model). The encoder model and the authentication model can then be used to generate signal template 316 for analysis by an authentication filter 306. For example, signal data 302 can be received by the encoder model to generate data signal template 316, which can then be processed by the authentication filter 306 to generate a classification 310. The classification 310 can be compared to a desired classification 312 in order to evaluate a loss function 314. The loss function 314 can then be used to adjust one or more parameters of the encoder model 304. The encoder model 304 can be refined until the encoder model 304 is able to produce a signal template 316 that generates classification 312 by using the authentication filter 306 that matches the desired classification 312. The trained encoder model 304 can then produce an input, or signal template, that may be used to generate the authentication filter 306. The authentication filter 306 can then be used to generate authentication classifications 310 without the high computing cost needed for processing with the authentication model 308 (e.g., in a standalone manner).

In some implementations, the authentication filter generation system 300 can include an encoder model 304 and a pre-trained authentication model 308 (e.g., a trained MCNET model). The encoder model 304 can be trained to generate synthetic and/or simulated signal data that will generate a desired classification 312 when processed by the authentication model 308. In some implementations, the encoder model 304 may process the signal data 302 to generate compressed and/or altered signal data that can be classified by the authentication model 308 to generate a classification 310, which can be compared against a desired classification 312 in order to evaluate a loss function 314. The resulting gradient descent of the loss function 314 can then be backpropagated to the encoder model 304 to adjust one or more parameters. The process can be repeated until the encoder model 304 generates simulated signal data that produces the desired classification 312. The simulated signal data can then be added to a bank of correlators that can be used to generate the authentication filter 306. Alternatively and/or additionally, the encoder model 304 may generate simulated signal data without being prompted by initial signal data 302. The authentication model 308 can be trained to process the simulated signal data to determine a classification 310 (e.g., an OOD classification, an ID classification, a particular device classification, or any other form of classification that may be utilized to determine network access). The simulated signal data can be generated by the input model 304 then processed by the authentication model 308 to generate a classification 310. If the classification 310 is not similar to, or match, the desired classification 312, one or more parameters of the input model 304 may be adjusted, and the process can begin again. When the classification 310 is similar to or matches the desired classification 312, the associated simulated signal data can be stored as a template, which can be utilized to generate an authentication filter 306. The authentication filter 306 can then compare (e.g., determine if the data is similar or matches) input signal data 302 to the simulated signal data to generate a classification 310 without the computational cost of the authentication model. In some implementations, the authentication filter 306 can include a plurality of simulated signal datasets associated with a plurality of devices and/or a plurality of possible classifications.

In some implementations, simulated signal data for a particular classification output can be utilized to generate an authentication filter 306. For example, the particular simulated signal data (that may be associated with the signal data 302 for a particular device) can be stored, and any newly received signal data can be compared to the particular template (e.g., the template associated with the particular simulated signal data) to determine if a match occurs. If a match does occur, the classification for the newly inputted signal data can be determined to be the same classification 310 as the original signal data 302. In particular, a user can obtain a plurality of signal datasets for devices the user wishes to give unrestricted network access to when connected to the network. The user can train the encoder model 304 and the authentication model 308 to generate in-domain classification for the plurality of signal datasets associated with a plurality of devices approved for network access. The authentication filter generation system 300 can then generate a plurality of templates, which can be utilized to generate one or more authentication filters 306.

Alternatively and/or additionally, the encoder model 304 and the authentication model 308 can be iteratively trained in order to learn a set of parameters for classifying the signal data 302. The trained parameters can then be utilized to determine and/or generate the template filter(s) 306 for classifying input signal data 302.

The authentication filter(s) 306 can include filters for known devices, filters for unrestricted access devices, filters for no network access devices, filters for limited access devices, and/or filters for malicious devices.

In some implementations, the systems and methods described herein can be deployed as hardware including a data acquisition stage and/or a processing stage. Example hardware configurations are depicted in FIGS. 4-5 and 10-12. The data acquisition stage can include any number of sensors, multiplexers, couplings, ports, etc. necessary to obtain the plurality of samples as described herein. For instance, in some implementations, the data acquisition stage can include port switching circuitry configured to switch (e.g., randomly switch) between a plurality of ports to obtain the plurality of samples. As one example, the data acquisition stage can include at least one analog-to-digital converter (ADC), a microcontroller or field-programmable gate array (FPGA) to handle initial signal processing, local control e.g., ADC, Port Switching, and/or memory synchronization, and/or downstream data transport. The data acquisition component's selection can be driven by the bandwidth and sampling rate required to perform device authentication. In some implementations, a bandwidth of about 350 MHz can be sufficient to achieve sufficient accuracy and/or could require a sampling rate of less than 1 GS/s. In some implementations, the data acquisition stage can be incorporated into network devices such as routers and/or switches. An example data acquisition stage is illustrated in FIG. 11.

Additionally and/or alternatively, the processing stage can include computing devices configured to perform processing associated with the systems and methods according to example aspects of the present disclosure. Generally, processing can include two computationally intensive processes: training and inferencing. The training process can occur periodically to keep the models (e.g., deep learning models) up-to-date based on the current set of authenticated devices. This can be performed on, for example, a server-side system containing GPU devices. Each deployment can employ only a single training system and/or a cloud-based training configuration. The inferencing portion of data processing can be performed closer to the network edge with embedded GPU or FPGA devices and/or may be maintained at the server system.

The device authentication process can include a deep learning component which can be performed by a heterogeneous processing solution or may include template matching with an authentication filter. In some cases, this can include a central processing unit (CPU) and GPU (e.g., embedded GPU) combination to allow portions of the generic processing to be performed in the CPU and the deep learning inferencing portion to be performed on the GPU. In some implementations, an authentication filter can be used in place of a deep learning component to reduce the amount of computational power needed for the device. The processing component requirements can be driven by the computational resources required to perform the deep neural network inferencing. This can, in turn, be driven by the size of the deep neural network required to perform device authentication.

Additionally and/or alternatively, the processing stage can be cloud-based. In this configuration, the data acquisition stage, located on-premises, can pass data to a cloud-based processing stage. This can allow the system to take advantage of the scalability provided by cloud-based GPU systems for both training and inferencing. An example processing stage is depicted in FIG. 12.

Figure 10:
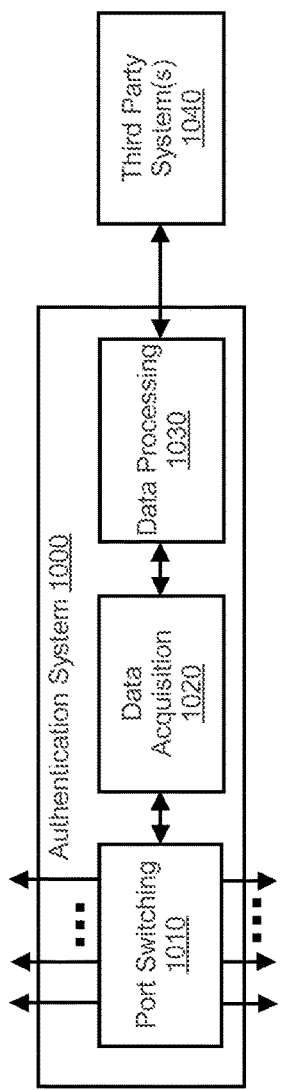
FIG. 10 depicts an example implementation of at least a portion of a network authentication system according to example aspects of the present disclosure.
Figure 11:
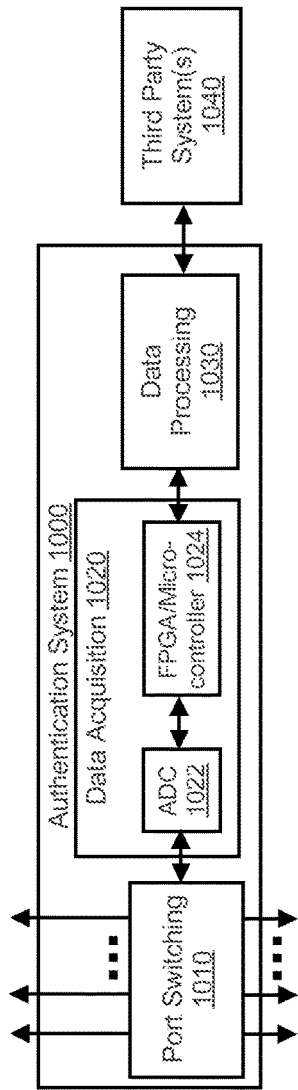
FIG. 11 depicts an example implementation of at least a portion of a network authentication system according to example aspects of the present disclosure.
Figure 12:
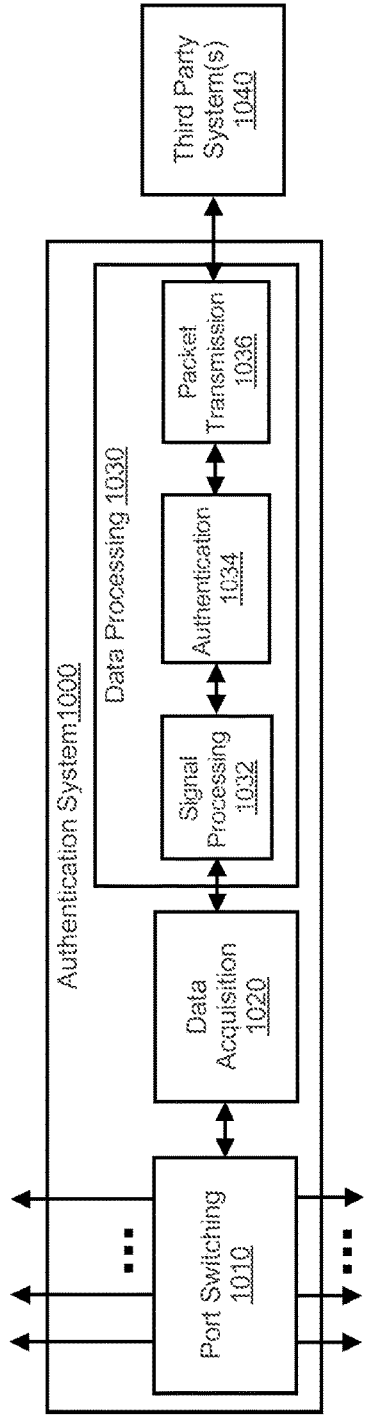
FIG. 12 depicts an example implementation of at least a portion of a network authentication system according to example aspects of the present disclosure.

The Third Party systems depicted in FIGS. 10-12 may be any number of different types of systems such as, for example, logging, intrusion detection, network access control (NAC), or software-defined network (SDN) control plane services, etc.

Figure 4:
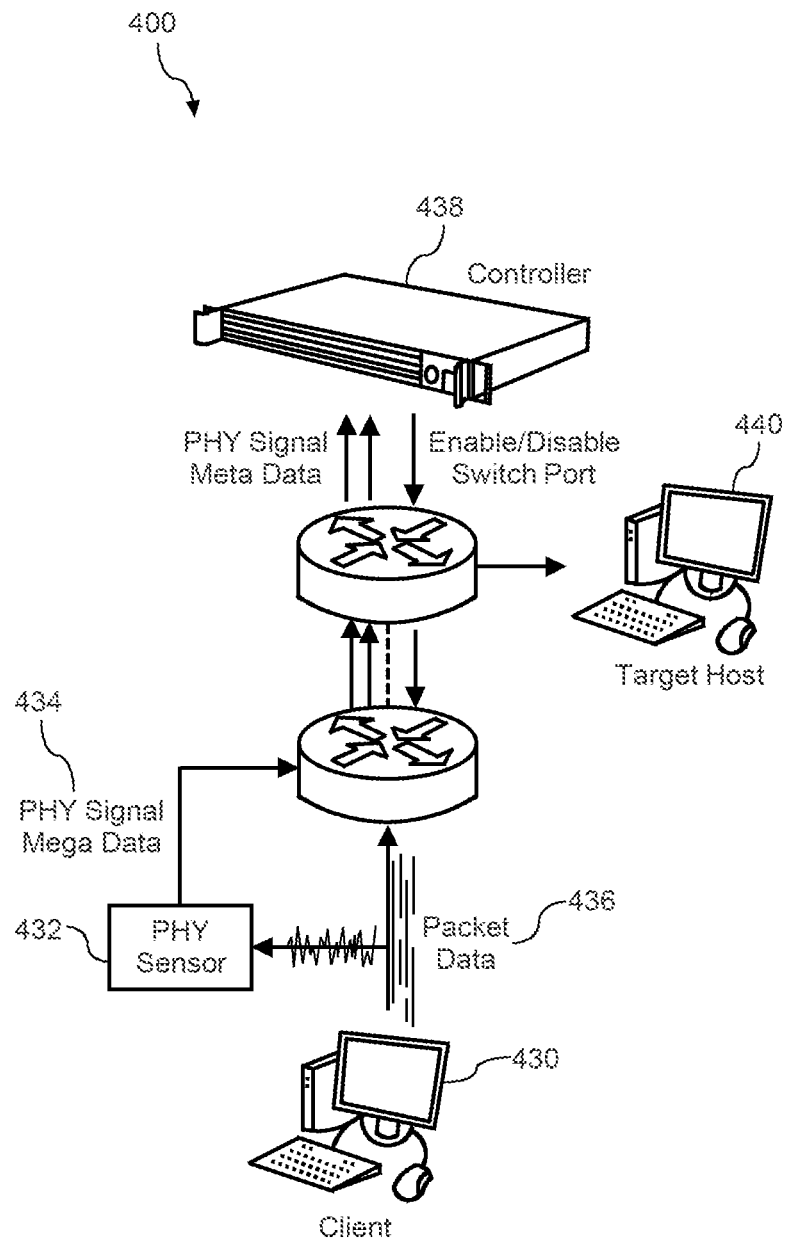
FIG. 4 depicts an example implementation of at least a portion of a network authentication system according to example aspects of the present disclosure.
Figure 5:
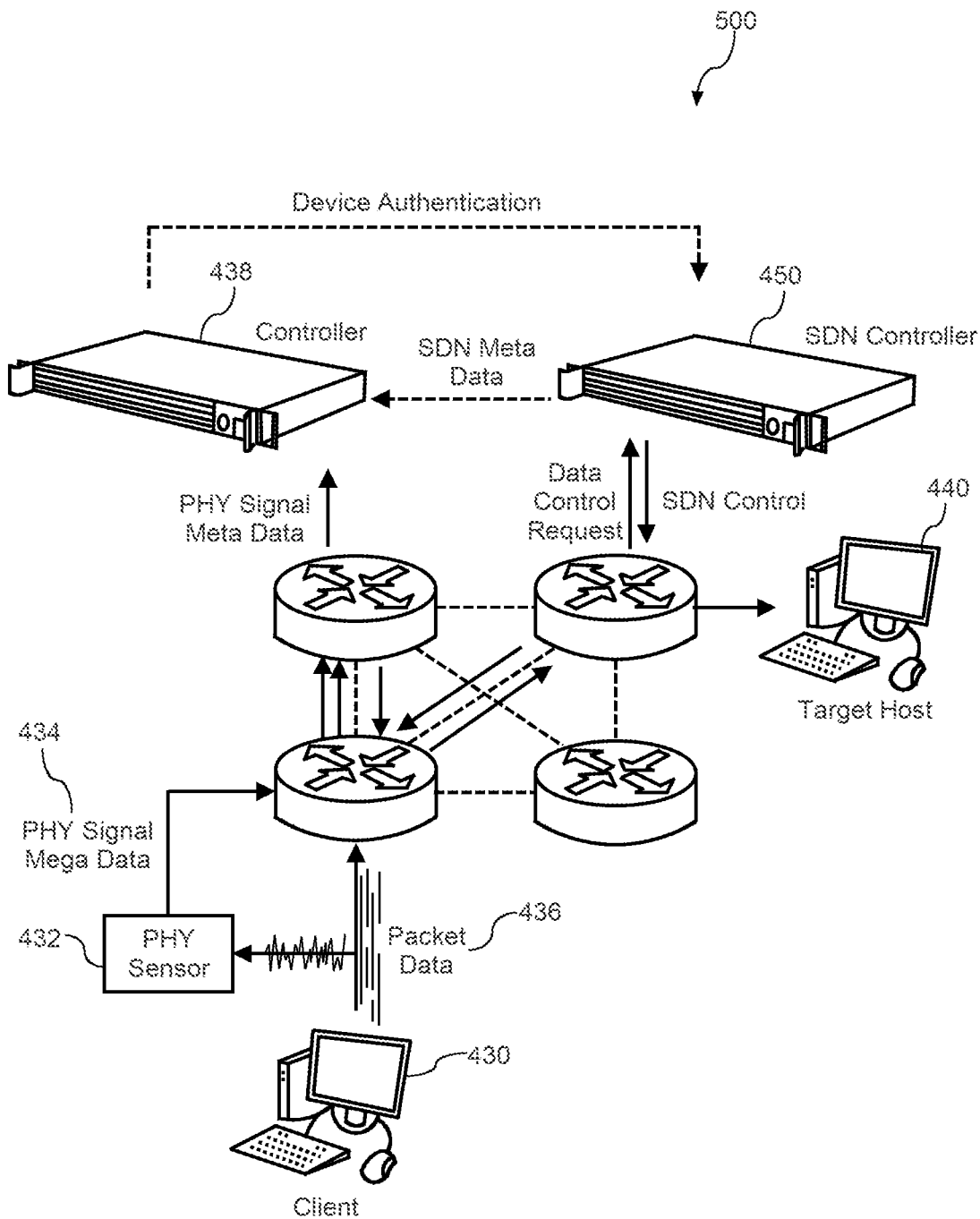
FIG. 5 depicts an example implementation of at least a portion of a network authentication system according to example aspects of the present disclosure.

FIG. 4 depicts an example implementation of an authentication classification system on a traditional network 400, and FIG. 5 depicts an example implementation of an authentication classification system on a SDN network 500. Both systems can include receiving data from a client device 430. The data can include packet data 436 for delivery to a target host 440, and physical metadata 434 obtained with a physical sensor 432. In some implementations, the physical sensor 432 may be recording voltage, electromagnetic emanations, or a variety of other physical signal data.

In a traditional network 400, both the packet data 436 and the physical metadata 434 may be directed to a controller 438 to perform authentication classification based on the physical metadata 434 to determine if the packet data 436 can be sent to the target host 440. Depending on the authentication classification output, the controller 438 may enable or disable a switch port to either allow transmission of the packet data 436 or deny transmission of the packet data 436.

In a SDN network 500, the physical metadata 434 may be directed to a controller 438 similar to the traditional network 400, but the packet data 436 may be directed to a separate SDN controller 450. The controller 438 may process the physical metadata 434 to determine an authentication classification, which can be communicated to the SDN controller 450, which can then instruct the system to either enable or disable the transmission of the packet data 436 to the target host 440.

Figure 9:
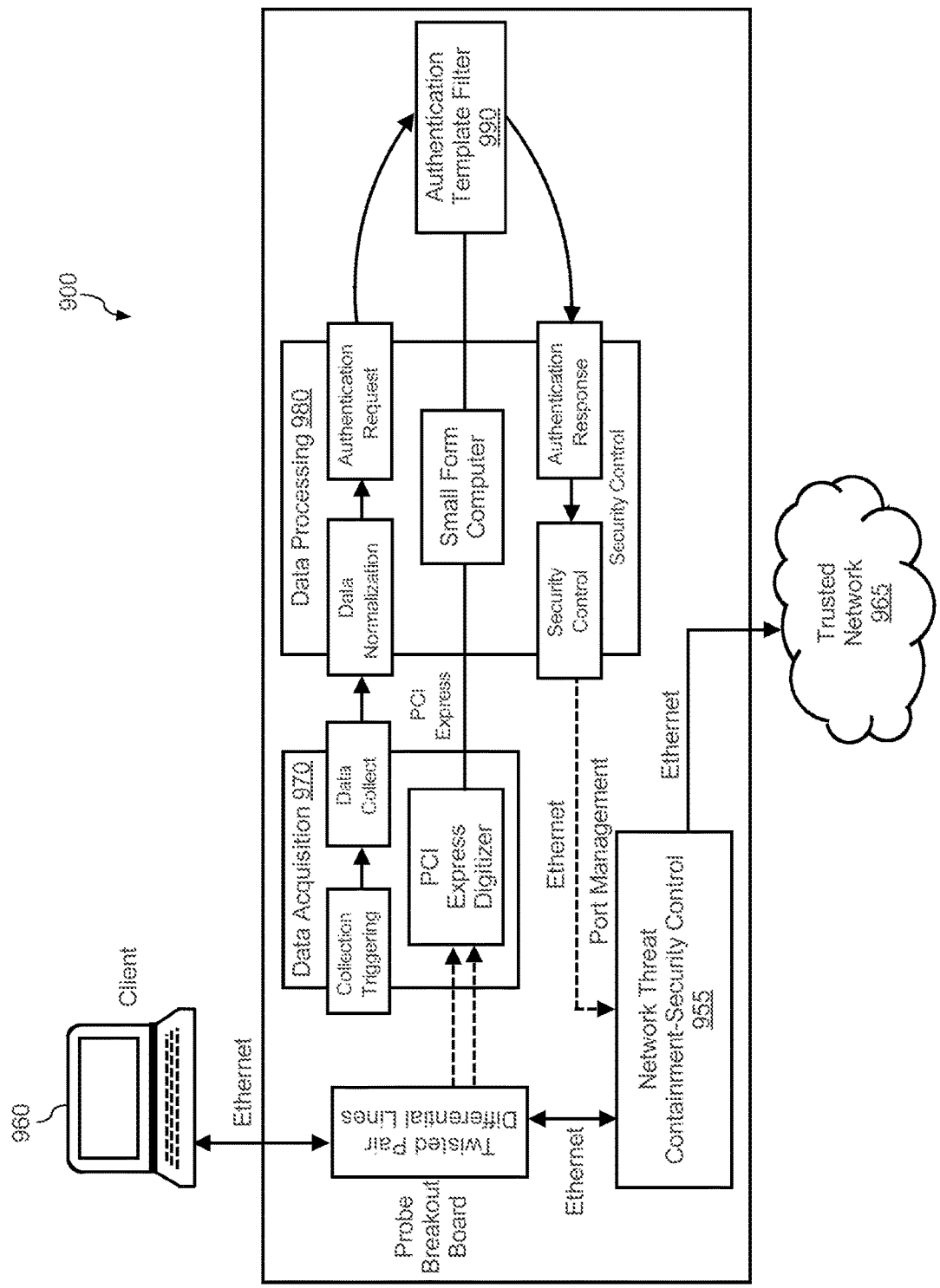
FIG. 9 depicts an example implementation of at least a portion of a network authentication system according to example aspects of the present disclosure.

FIG. 9 depicts example implementations of at least a portion of a network authentication system. Each of the depicted implementations includes a client device 960 requesting authorized access to a network 965. Furthermore, each of the implementations include data acquisition 970, data processing 980, and an authentication filter 990 for authentication classification that can be communicated to a network threat containment security control 955 to instruct the control 955 whether to provide authorized access or not.

Each depicted implementation varies in configuration and hardware. For example, the authentication system 900 in FIG. 9 includes a PCI Express Digitizer for data acquisition 970, a small form computer for data processing 980, an internal or external component for the authentication filter 990, and a router which can enable and disable ports based on the authentication classification. Another example can include an authentication system in which all steps are completed locally. The authentication system can include a PCI Express Digitizer for data acquisition, an embedded computer board for data processing and authentication filter processing, and a router which can enable and disable ports based on the authentication classification.

Another example authentication system can include a port network switch with an on-board ADC, a FPGA, and a coprocessor CPU for completing the data acquisition step and the data processing step of the authentication process. The port switch can be communicatively coupled with a desktop computer over a trusted network. The coupling with the desktop computer can allow for the communication for authentication filter processing and can provide for quicker retraining or updating. The port network switch and the desktop computer can communicate to process the physical data from the client device to generate an authentication classification to communicate to the network threat containment security control of the switch.

Moreover, FIG. 9 can convey a further breakdown of an example implementation of an authentication system. The system can begin with collection triggering and data collection as part of a data acquisition stage 970 to obtain a plurality of physical signal samples from a client device 960. Collection triggering or collection control can facilitate the collection of data from a device. Data collection can include ADC processing and organizing of the physical signals to generate the plurality of physical signal samples. The next stage can include a data processing stage 980, which can include data normalization and an authentication request sub-stage. The authentication request can be input into a ML data processing stage and/or an authentication filter processing stage 990, which can involve authentication processing. The output of the authentication processing sub-stage can include an authentication classification. For example, the data processing stage 980 and authentication filter 990 can entail or include processing the plurality of physical signal samples with an authentication filter to compare the signal samples against one or more templates to generate the authentication classification. Data normalization and generating an authentication request can include processing the data with a flattening layer and generating a device fingerprint. The device fingerprint can be processed with an authentication filter to generate the authentication classification. The authentication classification can then be received by the data processing stage 80 to determine an authentication response, which can then be relayed to a security control. The security control may then be used to facilitate access to the network, which can include turning a network port on or off.

FIGS. 10-12 depict block diagrams for an example authentication system. FIG. 10 depicts an example overview of an authentication system 1000 with port switching 1010, data acquisition 1020, and data processing 1030 before the transmission of data to third party systems 1040. The port switching portion 1010 can be used to collect a plurality of physical signals. The plurality of physical signals can be processed by the data acquisition portion 1020 to generate a plurality of physical signal samples that can be processed by the data processing portion 1030 to authenticate a device before data transmission.

FIG. 11 depicts a more detailed block diagram of the data acquisition portion 1020 of the authentication system 1000. In this implementation, the physical signals obtained from the one or more ports 1010 are processed by an analog-to-digital converter 1022. The output of the converter 1022 can then be processed by a field programmable gate array (FPGA) or a microcontroller 1024 before being fed to the data processing 1030 portion of the authentication system 1000 as a plurality of physical signal samples.

FIG. 12 depicts a more detailed block diagram of the data processing portion 1030 of the authentication system 1000. In this implementation, the output of the data acquisition portion 1020 is processed by the data processing portion 1030 of the authentication system 1000. Data processing 1030 can begin with signal processing 1032, which can involve processing the plurality of physical signal samples to generate a device fingerprint based at least in part on known devices. The device fingerprint can then be processed by an authentication model 1034 to generate an authentication classification. In response to the authentication classification, the packet transmission sub-model 1036 may communicate to the third party system(s) 1040. Third party systems 1040 can include network systems that exist on the trusted network, other devices on the trusted network, or any system protected by the authentication system 1000.

Figure 13:
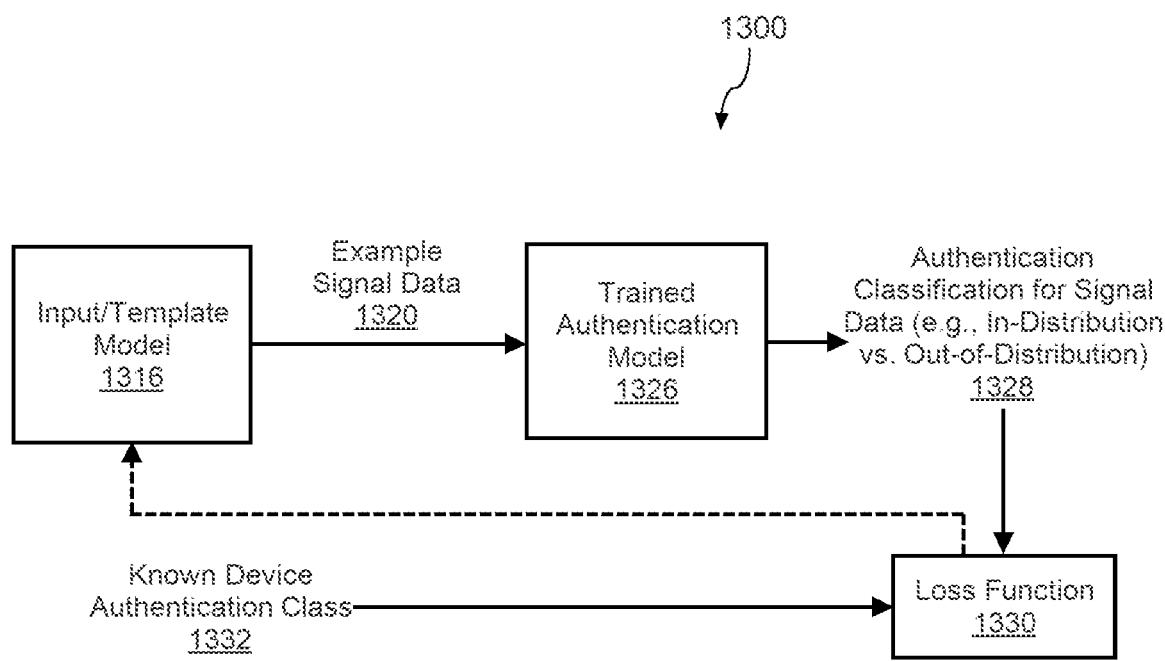
FIG. 13 depicts an example training process for an input model according to example aspects of the present disclosure.

FIG. 13 depicts an example training system for training the input model 1316, or template model. The input model 1316 can be configured and trained to generate example signal data 1320, or synthetic signal data. The example signal data 1320 can be processed by a trained authentication model 1326 to generate an authentication classification 1328. The authentication classification 1328 can be an authenticated class, an unauthenticated class, an in-distribution class, an out-of-distribution class, a medium authentication class, etc. The authentication classification 1328 can then be compared to a known device authentication class 1332 in order to evaluate a loss function 1330. The loss function 1330 can then be used to adjust one or more parameters of the input model 1316. The adjustments can include adjustments to augment the example signal data 1320 generation process in order to accenuate features the trained authentication model 1326 is using to classify data for a particular class. The training can continue until the input model 1316 generates an input the authentication model 1326 classifies as the known device authentication class 1332.

The process can be completed to generate a template for each known device the user wishes the filter be able to classify. The templates can then be used to generate an authentication filter that can be used for authentication classification tasks locally on port switch devices and network controller devices.

Figure 14A:
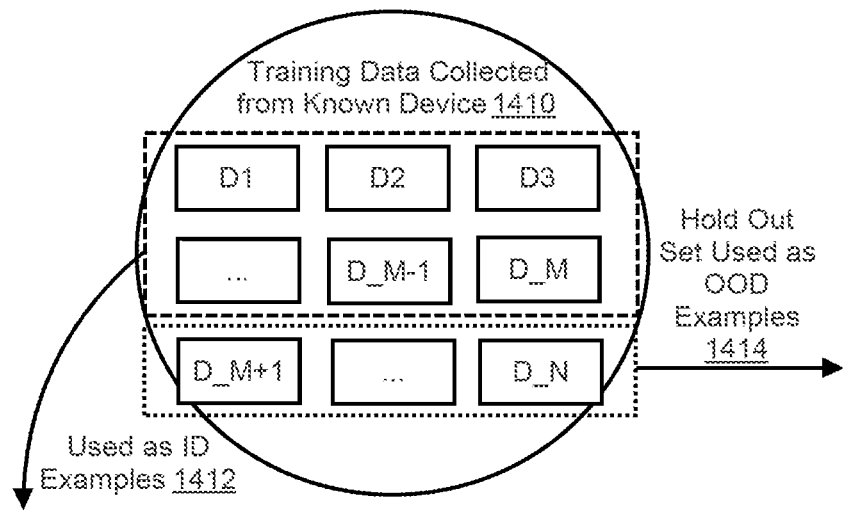
FIG. 14A depicts an example training dataset for the authentication model according to example aspects of the present disclosure.

FIG. 14A depicts an example training dataset for training the authentication model, which can include a first machine-learned model and/or a second machine-learned model. The training dataset can include training data collected from known devices 1410. The data can be collected over a wired connection and/or a wireless connection. The training dataset can include device data for a plurality of devices including a plurality of physical signal data for each respective device.

A first subset of the training dataset can include data that will be used to initially train the machine-learned model(s). A portion of, or all of, the training dataset may be used as ID examples 1412 for training a fingerprint generation model. The first subset can include data from a first device (D1) to data from an mth device (D_M).

A second subset of the training dataset can include a hold out data set 1414. These devices can be used to test the trained model(s) and can be used as example out-of-distribution devices for the network. The second subset can include data for a device (D_M+1) after the mth device to an nth device (D_N).

Figure 14B:
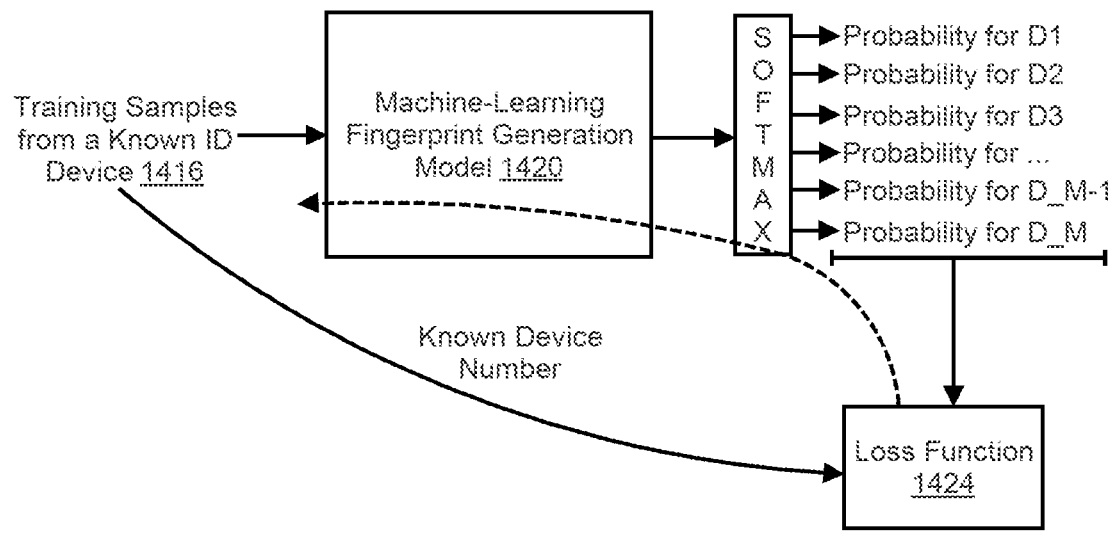
FIG. 14B depicts an example training process for an authentication model according to example aspects of the present disclosure.

FIG. 14B depicts a training process for training a machine-learning fingerprint generation model 1420 of the authentication model. In some implementations, the trained machine-learning fingerprint generation model 1420 may be included in a first machine-learned model of an authentication system. The training process can begin with obtaining training samples from a known ID device 1416, such as one of the known devices discussed in reference to 1412 of FIG. 14A. Training samples from the known ID device 1416 can be processed by the machine-learning fingerprint generation model to generate an output. The output can be processed by a softmax block to determine a set of probabilities 1422 descriptive of a likelihood the samples 1416 came from one of the known devices included in subset 1412. The set of probabilities 1422 can include a probability score associated with each known device (e.g., D1, D2, D3, ..., D_M−1, and D_M). The set of probabilities 1422 can then be compared with a known device number of the training samples 1416. In some implementations, the set of probabilities 1422 and the known device number may be used to evaluate a loss function 1424 to determine if adjustments to one or more parameters of the model 1420 need to be made (e.g., via backpropagation of the loss function 1424). In some implementations, the loss function 1424 can be a cross-entropy loss function.

After the model 1420 is trained, the machine-learning fingerprint generation model may be used to generate device fingerprints. The device fingerprints can include a set of scores (e.g., the probabilities output after softmax, the logits prior to softmax, and/or other hidden or latent representations generated by hidden or latent layers of the model 1420). In some instances, each score can be associated with one of the one or more known devices.

For example, if one of the known devices provides a plurality of physical signal samples to the machine-learning fingerprint generation model, the model may output one high score and several low scores. The high score can indicate that the samples processed belong to that specific known device. The scores, in the form of a generated device fingerprint, can then be processed by a classification model (e.g., shown as 1426 in FIG. 14C), which can provide a positive authentication classification, which can lead to the sampled device getting network access. However, samples from an unknown device can be processed by the fingerprint generation model to generate a device fingerprint with varying scores, where each score is relatively low compared to the high score of the known device, then the classification model may give a negative authentication classification. A negative authentication classification can indicate an out-of-distribution device, which can lead to limited to no network access being granted to the device.

Figure 14C:
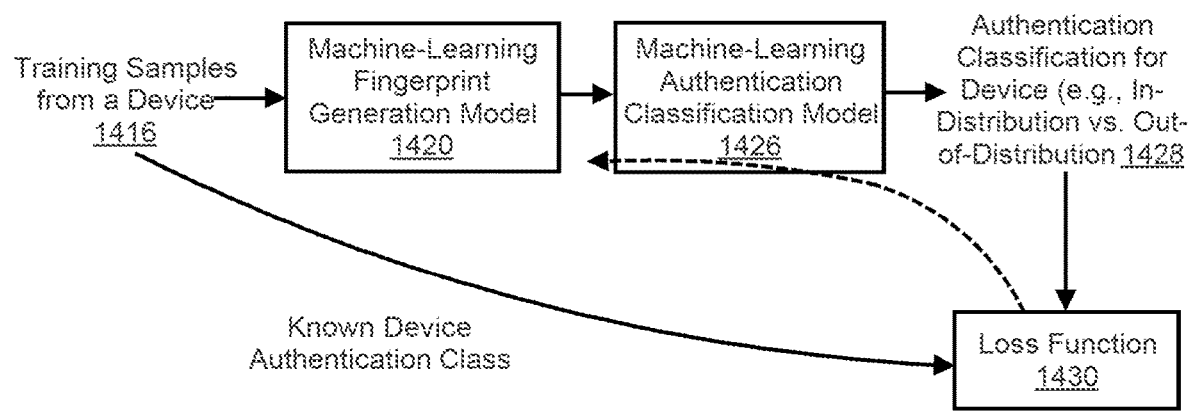
FIG. 14C depicts an example training process for an authentication model according to example aspects of the present disclosure.

Thus, the training samples from a known device 1416 (e.g., from the first subset 1412 from FIG. 14A and/or from the second subset 1414 from FIG. 14A) can be further utilized to train one or more machine-learning authentication classification models 1426. For example, FIG. 14C depicts a training process for training machine-learning authentication classification models 1426 for an authentication model.

The training process can begin with obtaining those training samples 1416, processing the samples with a machine-learning fingerprint generation model 1420, and generating a device fingerprint. The device fingerprint can be processed by the machine-learning authentication classification model 1426 to generate an authentication classification 1428 for the device. The authentication classification 1428 can be based at least in part on the device fingerprint and can, in some examples, be descriptive of a prediction of whether the device is an in-distribution device or an out-of-distribution device. The authentication classification 1428 can then be compared with a known device authentication class of the device from which the training samples 1416 were collected. In some implementations, the authentication classification 1428 and the known device authentication class may be used to evaluate a loss function 1430 to determine if adjustments to one or more parameters of the machine-learning authentication classification model 1426 need to be made (e.g., via backpropagation of the loss function 1430). In some implementations, the loss function 1430 can be a cross-entropy loss function. Optionally, the loss function 1430 can continue to be backpropagated to also jointly train the fingerprint generation model 1420.

After the classification model 1426 is trained, the machine-learning authentication classification model 1426 can be used to intake device fingerprints and output authentication classifications. The authentication classifications can include whether the samples belong to a device in-distribution or a device out-of-distribution and/or can provide a threat or authentication score among multiple possible levels. In some implementations, the authentication classification can provide a prediction of whether the device is a known or unknown device. The authentication classification can be used to determine if a device is granted access to some or all of a network and/or whether the device has access restrictions. In some implementations, a trained machine-learning authentication classification model 1426 can be included in a second machine-learned model of an authentication system.

Example Methods

Figure 6:
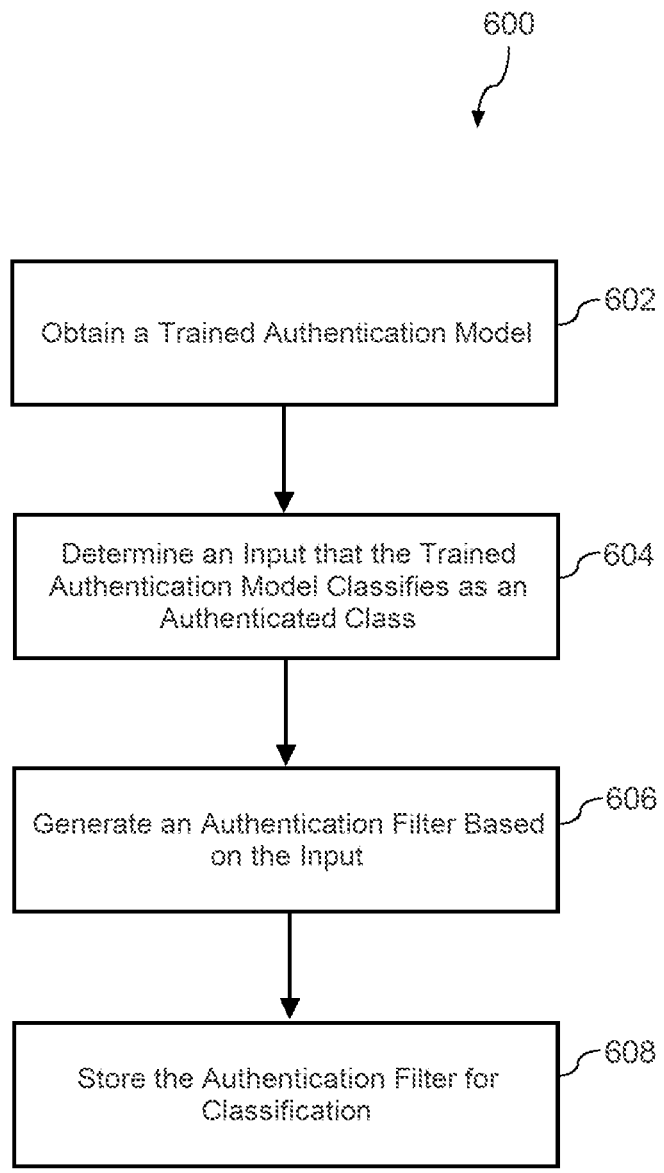
FIG. 6 depicts a flow chart diagram of an example method to perform authentication filter generation according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a trained authentication model. A trained authentication model can include a first machine-learned model for processing signal data to generate a device fingerprint and can include a second machine-learned model for processing the device fingerprint to generate an authentication classification. The trained authentication model can be trained with labeled signal data samples. In some implementations, the trained authentication model can be stored on a server computing system or stored locally on a local computing device.

At 604, the computing system can determine an input that the trained authentication model classifies as an authenticated class. The authenticated class can be associated with authenticated signal data generated by an authenticated computing device. Determining the input can involve brute force input of randomized signal data or may utilize a machine-learned model for learning to generate synthetic signal data the authentication model classifies as the authenticated class. Training the machine-learned model can involve the use of a classification loss.

At 606, the computing system can generate an authentication filter based on the input. The input can be used as a template and may be stored in an authentication filter for template matching. The authentication filter can include one template for binary classifications or a plurality of templates for determining a plurality of classifications.

At 608, the computing system can store the authentication filter for classification. The authentication filter can be stored on a server computing system or may be stored locally on a port switch device or a network controller device.

Figure 7:
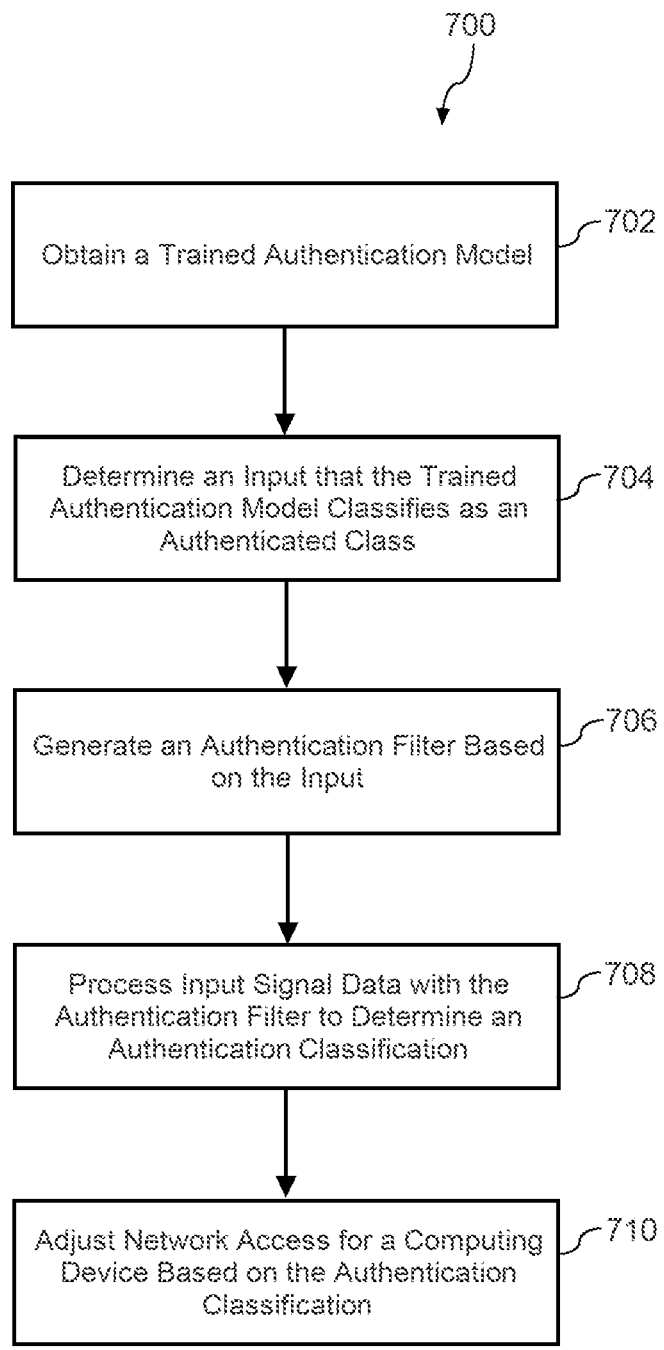
FIG. 7 depicts a flow chart diagram of an example method to perform computing device authentication according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a trained authentication model. The trained authentication model can include an MCNet model, a Resnet model, and/or another machine-learned model. The authentication model can include a device fingerprint generation model and an authentication classification model.

At 704, the computing system can determine an input that the trained authentication model classifies as an authenticated class. The input can be synthetic or simulated signal data generated with a genetic algorithm, a machine-learned model, and/or black box optimization. The input can include noise or may be preprocessed to remove noise. The authenticated class can be associated with a known computing device the authentication model is trained to classify.

At 706, the computing system can generate an authentication filter based on the input. The authentication filter can include the input as a template for use in template matching in order to determine the authentication classification of input signal data.

At 708, the computing system can process input signal data with the authentication filter to determine an authentication classification. The input signal data can be processed with the authentication filter to determine the classification the input signal data is most associated with. The input signal data can be compared to each template of the authentication filter to determine the closest match. The closest match can then be used to determine the authentication classification. The authentication classification may be output with a confidence level and/or may require a threshold level of confidence for classification.

At 710, the computing system can adjust network access for a computing device based on the authentication classification. The different possible authentication classifications may be associated with different network access levels, such that authenticated devices are provided unrestricted access, while unauthenticated devices are provided limited or no network access.

Figure 8:
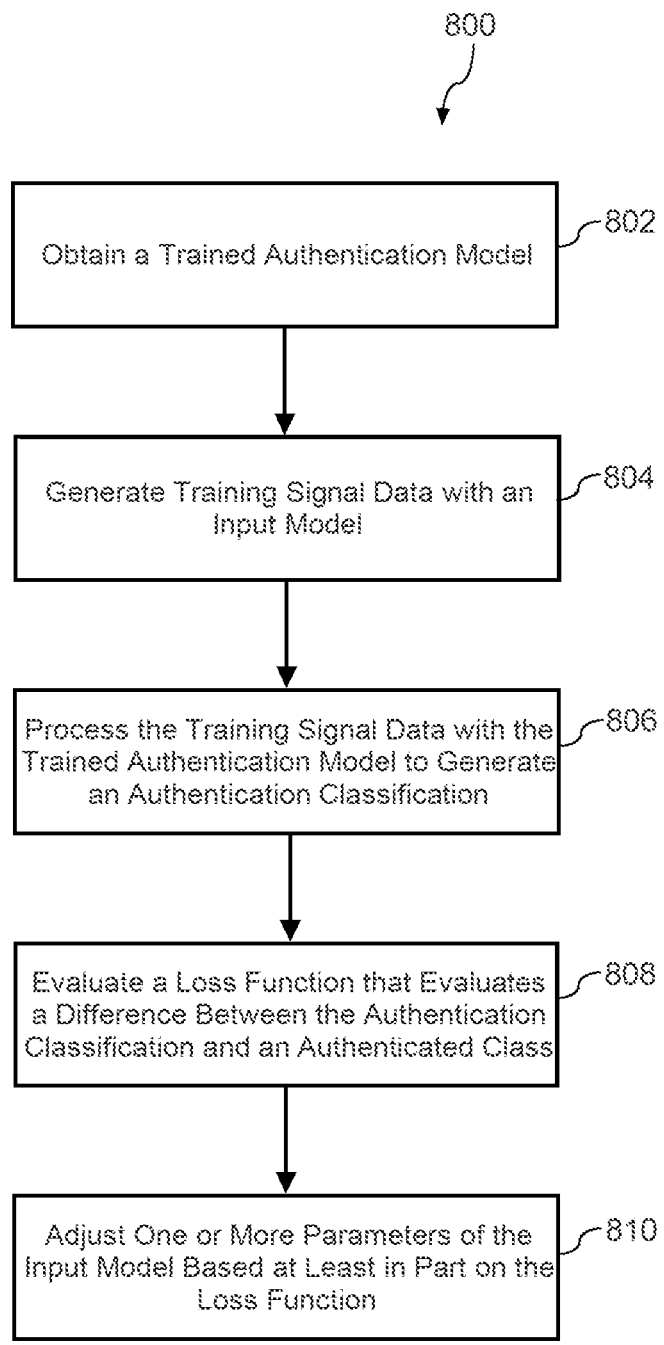
FIG. 8 depicts a flow chart diagram of an example method to perform input model training according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a trained authentication model. The trained authentication model can include a support vector machine model and an encoder model. The trained authentication model can include a convolution neural network with one or more fully convolutional layers. In some implementations, the trained authentication model can be trained for a set number of local devices or may be trained to generally classify computing devices in a global implementation.

At 804, the computing system can generate training signal data with an input model. The training signal data can include synthetic signal data generated to trick the trained authentication model to classify the data as data coming from a particular computing device.

At 806, the computing system can process the training signal data with the trained authentication model to generate an authentication classification. The authentication classification can be associated with one or more computing devices or may be associated with an unknown computing device classification.

At 808, the computing system can evaluate a loss function that evaluates a difference between the authentication classification and an authenticated class. The input model may be trained to generate input that the trained authentication model classifies as an authenticated class; therefore, the training system may evaluate the training signal data output against the desired output.

At 810, the computing system can adjust one or more parameters of the input model based at least in part on the loss function. The process can be repeated until the input model consistently generates synthetic signal data the trained authentication model classifies as an authenticated class. Training may allow the input model to consistently generate data with the features the trained authentication model uses for classification.

Example Authentication Models

The trained authentication model can be trained using a variety of techniques and may include a variety of sub-blocks or models. For example, the authentication model can be trained and/or configured to determine a specific computing device is communicating with a network based on the physical signal data received.

Specifically, based on signals that the device transmits and/or receives, the systems and methods can determine a device fingerprint associated with the device (e.g., uniquely representative of the device). For example, the data used to authenticate a device can include samples of one or more physical communication signals associated with the device. The physical communication signals can be wired signals or wireless signals. The samples can capture physical data associated with the physical signals, such as a voltage magnitude on a wired connection carrying signals transmitted by the device or characteristics of electro-magnetic emanations transmitted by the device.

Once the device fingerprint has been generated for the device, the systems and methods can then determine a classification of the device based on the device fingerprint. The classification can be indicative of whether or not the device is an interfering device or an allowed network device, for example. Thus, in some examples, the classification can be a binary classification such as, for example, a binary classification that classifies the device as belonging to the network (e.g., in-distribution) and/or not belonging to the network (e.g., out-of-distribution). Alternatively or additionally, a multi-class classification can be generated such as, for example, a classification that classifies a device into a number (e.g., greater than two) of different threat and/or authentication levels.

The systems and methods according to example aspects of the present disclosure can perform or cause to be performed one or more network controls based on the authentication classification for the device. For example, one or more ports (e.g., in a network switch or router) can be controlled (e.g., opened or closed) to grant the device a level of network access that correlates to the authentication classification for the device.

Generally, the systems and methods disclosed herein can be implemented for authentication classification for network access. For example, a device may be requesting access to a network via a wired or wireless connection. The systems and methods can include obtaining a plurality of physical signal samples from a device on a network (e.g., voltage, signals over 10BASE-T, signals over 100BASE-TX, bus signals, radio frequency emanation, electromagnetic emanation, operational RF, antenna interpretation voltage, etc.). In some implementations, the collected physical signal samples can be intended emissions and/or unintended emissions over a wired connection or a wireless connection.

The plurality of physical signal samples can be processed by a first model to determine a device fingerprint. In some implementations, the device fingerprint can be processed by a second model to generate one or more classifications. The first model and/or the second model can be machine-learned models. The one or more classifications can include an authentication classification. The authentication classification can be descriptive of whether and/or what level of authorization the device has on the network. For example, the authentication classification may include a binary result of whether the device is authenticated or not. In some implementations, the systems and methods can include adjusting device access to the network in response to a negative authentication classification.

In some implementations, the device fingerprint can be determined based on samples taken from a physical layer of the network (e.g., hardware). For instance, some systems attempt to identify a device based on higher-level characteristics, such as, for example, medium address control (MAC) addresses, IP addresses, etc. In the case of an interfering device, it can be possible to spoof, or misrepresent, these characteristics. However, by sampling from a physical layer, it can be difficult and/or impossible to misrepresent these characteristics, especially without disrupting the (possibly illicit) function of the interfering device. Thus, determining a device fingerprint based on physical layer characteristics can contribute to improved security of a network. Furthermore, because the systems and methods according to example aspects of the present disclosure can sample from a signal concurrently with transmission of the signal (e.g., by measuring a voltage, current, frequency characteristics, etc.), the systems and methods according to the present disclosure can operate without interference to functions of the network. This can prevent disruptions or crashes, for example, in operation of the network.

For instance, computing systems have experienced a slow migration away from stove-piped and isolated industrial control system (ICS) architectures towards more integrated, highly-connected designs. This migration has contributed to an increase in the attack surface of these systems when viewed from the perspective of cybersecurity. For instance, some information technology (IT) and operational technology (OT) networks share much of the same hardware and communications infrastructure and often the same host operating system software. However, OT networks have more stringent requirements on availability, reliability and data integrity than most corporate enterprise-type networks. Despite these requirements, OT is less commonly equipped with intrusion detection, intrusion prevention, access control, and virus detection systems. This lack of protection from cyber attacks can leave some critical infrastructure vulnerable. Furthermore, some higher layer approaches can require actively probing the network, which can disrupt intended OT network activities. For instance, legacy devices on OT networks performing critical functions may crash due to active port scans.

To solve this and other problems, systems and methods according to example aspects of the present disclosure can classify devices by exploiting intrinsic physical features of the communication signals from these devices. This technique can be referred to as fingerprinting, in reference to the use of unique characteristics of a physical device imprinted on its communication signals, much like human fingerprints. For instance, systems and methods according to example aspects of the present disclosure can monitor electrical signals that are transmitted on a wire or through the air to communicate with other devices and classify those signals as belonging to a particular device, such as an allowable device within the network (e.g., an in-distribution device). In some implementations the communication signals can be electromagnetic signals (e.g., light) and may utilize or be transmitted using fiber optics for communication. These systems and methods can be utilized over a single port or a variety of ports simultaneously. The systems and methods may include collecting one or any number of output signals from a device. In some implementations, these systems and methods can be used in conjunction with systems and methods for fingerprinting based on higher-level infrastructure (e.g., MAC addresses, etc.) to obtain a more complete understanding of a device.

Hyperparameters of the models discussed herein can be selected to provide desirable accuracy, compute time, memory usage, speed of training, etc. For instance, hyperparameters that may be selected can include, but are not limited to, input length (e.g., number of samples), number of hidden layers, width of layers (e.g., number of features), batch size, dataset split, and/or any other suitable hyperparameters.

A computing system can sample a plurality of signal samples associated with a network device. For example, in some implementations, the computing system can sample a plurality of signal samples, such as random samples, from a preamble of a communication. As one example, the computing system can sample from a single point within a network (e.g., at an Ethernet connection) and/or from a plurality of points (e.g., at a number of ports within the network, which can include an ADC sampling data from the plurality of ports) to sample the plurality of signal samples. For instance, in some implementations, the computing system (or some portion thereof such as a sensor portion of the system) can be included in a standalone device that couples to one or more points on the network and samples connections (e.g., voltage levels, currents, etc.) at the one or more points on the network. Additionally and/or alternatively, in some implementations, the computing system (or some portion thereof) can be included with (e.g., embedded within) another network device, such as a network switch, router, controller, or the like. In some implementations, the proposed system can be implemented in a single device (e.g., implemented "on-device"). In other implementations, the proposed system can be implemented using multiple devices such as a local sensor device and a remote server system.

Any number of signal samples may be employed. In some implementations, a greater amount of signal samples can provide improvement in accuracy up to a certain number of samples, beyond which improvement is marginal, if any. Thus, in some implementations, the number of samples may be selected to be about the number of samples at which the improvement per increase in sample decreases. Additionally and/or alternatively, the number of samples may be selected to limit the effects of overfitting. As one example, a correlation may exist between number of samples and depth of a neural network used for device fingerprint determination, for which the number of samples may be selected to mitigate the effects of overfitting. In some implementations, the number of samples can be about 2000, such as about 2048.

In some implementations, during training of the systems and methods according to example aspects of the present disclosure, some of the plurality of signal samples can be dropped to produce downsampled signal samples. The downsampled signal samples can be used to train and/or produce inferences from, for instance, machine-learned models in the systems and methods. Alternatively or additionally, the systems and methods may utilize digital filtering to aid in training and/or produce inferences from the systems and methods.

In some implementations, the plurality of signal samples can be provided (e.g., input) into a first modeling component. The first modeling component can be configured to provide a device fingerprint of the device based at least in part on the plurality of signal samples. For instance, in some implementations, the first modeling component can be a machine-learned model, such as, for example, a convolutional neural network (CNN). The CNN can have some number of hidden layers, such as, for example, about 3 and/or about 4 hidden layers. In some implementations, the architecture of the first machine-learned model can include a classification model. Additionally and/or alternatively, the architecture of the first machine-learned model can include an MCNet architecture.

Additionally and/or alternatively, in some implementations, the first machine-learned model can be a residual neural network (Resnet). Residual neural networks can include one or more skip connections. In some cases, residual neural networks can experience lessened vanishing gradients over CNNs and/or provide improved depth capabilities. In some implementations, the first machine-learned model can include and/or receive data from an analog-to-digital converter and a microcontroller. The first machine-learned model may include modulation recognition to determine the device fingerprint. The modulation recognition can include using signal identification (e.g., classifying a signal as a specific protocol standard (10BaseT/100BaseTX/ 802.11g/LTE)) to assist in selecting an appropriate first machine-learned model to fingerprint that signal type.

In some implementations, features of the first machine-learned model can be selected to be specific to the devices. However, the ability to utilize neural network structures without requiring selecting of specific features can be desirable. In some implementations, neural network architectures can be utilized to identify and learn the most salient information for use in generating device fingerprints that can differentiate devices from one another, obviating the need to identify and generate manually-engineered features for each signal type.

The first machine-learned model can include a flattening layer configured to flatten the output of the first machine-learned model into a flattened vector. Additionally and/or alternatively, the first machine-learned model can include dense layers subsequent to the flattening layer. For instance, the first machine-learned model can include one or more linear activation layers subsequent to the flattening layer. For instance, the output of the one or more linear layers (e.g., a plurality of floating point numbers) can be the device fingerprint. In some implementations, the device fingerprint may be an embedding generated by an embedding model of the first machine-learned model.

Moreover, the first machine-learned model can be trained on a set of known devices to generate a set of known device fingerprints. The first machine-learned model can then generate device fingerprints for one or more unknown devices based on a similarity score to each known device of the set of known devices. Therefore, device fingerprints can be generated for both known and unknown devices for logging each device being classified. For example, the first machine-learned model can be trained on twenty known devices (the number twenty simply used as an example), such that if one of these known devices sends signals, the first machine-learned model can provide a very high score indicating that the device is the previously known device, and very low scores associated to the other devices descriptive of the device fingerprint belonging to that specific known device and not the other known devices. Physical signal samples can then be processed by the trained first machine-learned model to output a similarity score relative to each of the twenty known devices. Each individual score related to each known device can be stored as the device fingerprint for the unknown device. In some implementations, upon authentication, a device fingerprint of a formerly unknown device may be added to the set of known devices upon retraining. In some implementations, the first machine-learned model can be trained with some holdback training data to test the determination of device fingerprints of unknown devices. In some implementations, the first machine-learned model may implement a cross-entropy loss function.

Additionally and/or alternatively, the device fingerprint can be provided (e.g., input) into a second modeling component. The second modeling component can be a second machine-learned model. In some implementations, the second machine-learned model can be a classifier model, such as, for example, a support vector machine (SVM) model. In another example, the second model can be a neural network. The second machine-learned model can be configured to provide a classification of the sampled network device based on the device fingerprint. For example, the sampled network device can be classified as an in-distribution device and/or an out-of-distribution device based at least in part on the device fingerprint. As one example, the second machine-learned model can be trained using training data including device fingerprints labeled with an appropriate classification (e.g., ID and/or OOD). The second model can thus be trained to distinguish between ID devices and OOD devices. Based on the training and in response to receiving a device fingerprint, the second model can thus output a predicted classification associated with the device fingerprint. The second machine-learned model may be retrained often and may be configured to be retrained quickly.

The second machine-learned model can be trained for authentication prediction. Authentication prediction can include generating one or more classifications based at least in part on the processed device fingerprint. The one or more classifications can include an authentication classification that is descriptive of an authorization prediction. The authentication classification can be a binary prediction of whether the device is authorized or not. The binary prediction can be based on whether the device is determined to be known or unknown by the model. Additionally and/or alternatively, the authentication classification can be a scalar output descriptive of a level of authorization. For example, some devices may be given a limited guest authorization, a semi-restricted employee authorization, or a full authorization with no restriction based on the authentication classification. Authorization level may be based on the assigned authorization, a level of certainty, and/or the amount of information collected from the device.

In some implementations, the second machine-learned model can be trained and retrained through a registration process. The administrator of the system can collect a certain amount of device fingerprints. The device fingerprints can then be processed by the second machine-learned model with labels to generate a retrained model, which can be pushed to the authentication classification system to provide an updated model. Retraining can be completed on a timer basis and/or a quantitative basis based on the amount of devices requesting access. Re-training of only the second model upon registration of a new device can provide for faster re-training and savings of computational costs, for example as compared to re-training of both models or a larger model equivalent to the combination of the two models.

In some implementations, one or more neural networks can be used to provide an embedding (e.g., the device fingerprint) based on the input data (e.g., the samples). For example, the embedding can be a representation of knowledge abstracted from the input data into one or more learned dimensions. In some instances, embeddings can be a useful source for identifying related entities. In some instances, embeddings can be useful inputs for downstream models. For example, embeddings can be useful to generalize input data for a downstream model or processing system. An embedding model can be configured to receive a plurality of inputs and to respectively process each input to produce a respective embedding. In some implementations, an embedding can be a mapping of discrete inputs to continuous vectors or tensors of real numbers in a representational space. Embeddings can describe or represent features or patterns within the inputs. Many machine-learned models configured to categorize or recognize patterns in data employ embeddings (e.g., at their hidden layers).

In some implementations, a classification model can be transformed into an embedding model by training the classification model to perform a classification task and, following such training, removing one or more final layers from the classification model, so that the model provides as its output an embedding that previously was provided at a hidden layer of the model. In other implementations, a model can be directly trained to provide embeddings as its output.

An embedding can be useful for a number of different uses, including, for example, determining a measure of similarity between two different inputs. In particular, a similarity between two or more embeddings respectively associated with two or more inputs or data elements can be indicative of a similarity between the two or more inputs or data elements. Likewise, a dis-similarity between the embeddings can indicate a dis-similarity between the inputs or data elements. In one example, a similarity or relatedness between inputs can be determined by calculating some distance (e.g., a Euclidean distance, an L2 distance, an L1 distance, etc.) between their respective embedding vectors. Other similarity metrics can be used as well. Such measure of similarity can be useful for performing, among other applications, similarity search, entity recognition, or other tasks.

In some implementations, the first modeling component and the second modeling component can be trained separately. The modeling components can be trained on labeled training sets and may be trained using transfer learning techniques.

In some implementations, the systems and methods described herein can be deployed as hardware including a data acquisition stage and/or a processing stage. Example hardware configurations are depicted in FIG. 10-12. The data acquisition stage can include any number of sensors, multiplexers, couplings, ports, etc. necessary to obtain the plurality of samples as described herein. For instance, in some implementations, the data acquisition stage can include port switching circuitry configured to switch (e.g., randomly switch) between a plurality of ports to obtain the plurality of samples. As one example, the data acquisition stage can include at least one analog-to-digital converter (ADC), a microcontroller or field-programmable gate array (FPGA) to handle initial signal processing, local control, e.g. ADC, Port Switching, and/or memory synchronization, and/or downstream data transport. The data acquisition component's selection can be driven by the bandwidth and sampling rate required to perform device authentication. In some implementations, a bandwidth of about 350 MHz can be sufficient to achieve sufficient accuracy and/or could require a sampling rate of less than 1 GS/s. In some implementations, the data acquisition stage can be incorporated into network devices such as routers and/or switches. An example data acquisition stage is illustrated in FIG. 11.

Additionally and/or alternatively, the processing stage can include computing devices configured to perform processing associated with the systems and methods according to example aspects of the present disclosure. Generally, processing can include two computationally intensive processes: training and inferencing. The training process can occur periodically to keep the models (e.g., deep learning models) up-to-date based on the current set of authenticated devices. This can be performed on, for example, a server-side system containing GPU devices. Each deployment can employ only a single training system and/or a cloud-based training configuration. The inferencing portion of data processing can be performed closer to the network edge with embedded GPU or FPGA devices and/or may be maintained at the server system.

The device authentication process can include a deep learning component which can be performed by a heterogeneous processing solution. In some cases, this can include a central processing unit (CPU) and GPU (e.g., embedded GPU) combination to allow portions of the generic processing to be performed in the CPU and the deep learning inferencing portion to be performed on the GPU. The processing component requirements can be driven by the computational resources required to perform the deep neural network inferencing. This can, in turn, be driven by the size of the deep neural network required to perform device authentication.

Additionally and/or alternatively, the processing stage can be cloud-based. In this configuration, the data acquisition stage, located on-premises, can pass data to a cloud-based processing stage. This can allow the system to take advantage of the scalability provided by cloud-based GPU systems for both training and inferencing. An example processing stage is depicted in FIG. 12.

The Third Party systems depicted in FIGS. 10-12 may be any number of different types of systems such as, for example, logging, intrusion detection, network access control (NAC), or software-defined network (SDN) control plane services, etc.

Computer-readable instructions for completing the disclosed method can be stored and/or implemented on a device or in the cloud. The device can be an all in one device in the form of a router, switch, controller, or other network device with one or more ports and one or more sensors. Alternatively, the device may be implemented as a dongle to be plugged into a network device to protect the network device and the network.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
    obtaining, by a computing system comprising one or more processors, a trained authentication model, wherein the trained authentication model is trained to classify a computing device based on signal data;
    determining, by the computing system, an input that the trained authentication model classifies as an authenticated class, wherein the authenticated class is descriptive of authenticated signal data associated with an authenticated computing device, wherein determining, by the computing system, the input that the trained authentication model classifies as the authenticated class comprises: generating, by the computing system, example signal data with an input model, wherein the input model is trained by:
        generating, by the computing system, training signal data with the input model;
        processing, by the computing system, the training signal data with the trained authentication model to generate an authentication classification;
        evaluating, by the computing system, a loss function that evaluates a difference between the authentication classification and the authentication class; and
        adjusting, by the computing system, one or more parameters of the input model based at least in part on the loss function;
    generating, by the computing system, an authentication filter based on the input; and
    storing, by the computing system, the authentication filter for classification.

2. The computer-implemented method of claim 1, further comprising:
    processing, by the computing system, input signal data with the authentication filter to determine an authentication classification for the input signal data.

3. The computer-implemented method of claim 2, further comprising:
    adjusting, by the computing system, network access for a computing device based on the authentication classification, wherein the input signal data is generated by the computing device.

4. The computer-implemented method of claim 1, wherein the trained authentication model is trained based on labeled signal data.

5. The computer-implemented method of claim 1, wherein the input model comprises generative neural network.

6. The computer-implemented method of claim 1, wherein the input model comprises an autoencoder.

7. The computer-implemented method of claim 1, wherein the input model comprises a long short-term memory model.

8. The computer-implemented method of claim 1, wherein the input model is trained to:
    determine one or more features the trained authentication model uses for authentication classification; and
    generate the input based on the one or more features.

9. The computer-implemented method of claim 1, wherein determining, by the computing system, the input that the trained authentication model classifies as the authenticated class comprises at least one of black box optimization, randomized signal generation, training a machine-learned model, or a genetic algorithm.

10. A computing system for network authentication, the system comprising:
    one or more sensors configured to collect a plurality of physical signal samples associated with physical communication signals of a device on a network;
    one or more non-transitory computer-readable media that collectively store:
        an authentication filter generated based on one or more classification parameters for a trained authentication model, wherein the authentication filter comprises data descriptive of authenticated signal data;
        wherein the authentication filter is configured to determine an authentication classification, wherein the authentication classification is determined based at least in part on if obtained signal data is associated with one or more authenticated computing devices;
        wherein the authentication filter was generated based at least in part on example signal data generated with an input model, wherein the input model was trained by:
            determining an input that a trained authentication model classifies as an authenticated class
            generating training signal data with the input model;
            processing the training signal data with the trained authentication model to generate the authentication classification;
            evaluating a loss function that evaluates a difference between the authentication classification and the authentication class; and
            adjusting one or more parameters of the input model based at least in part on the loss function; and
    a controller configured to control one or more ports of a network switch or router of the network based on the authentication classification for the device.

11. The computing system of claim 10, wherein the one or more non-transitory computer-readable media further store:
    a second authentication filter generated based on one or more second classification parameters for the trained authentication model, wherein the second authentication filter comprises data descriptive of second authenticated signal data; and
    wherein the second authentication filter is configured to determine if obtained signal data is associated with one or more second authenticated computing devices.

12. The computing system of claim 10, wherein the authenticated signal data comprises data with one or more features determined to match one or more authenticated features of the one or more authenticated computing devices.

13. One or more non-transitory computer readable media that collectively store instructions that, when executed by one or more processors, cause a computing system to perform operations, the operations comprising:
- obtaining a trained authentication model, wherein the trained authentication model is trained to classify a computing device based on signal data;
- generating training signal data with an input model;
- processing the training signal data with the trained authentication model to generate an authentication classification;
- evaluating a loss function that evaluates a difference between the authentication classification and an authenticated class, wherein the authenticated class is associated with authenticated signal data generated by an authenticated computing device;
- adjusting one or more parameters of the input model based at least in part on the loss function;
- determining an input that the trained authentication model classifies as the authenticated class, wherein the authenticated class is descriptive of the authenticated signal data associated with the authenticated computing device; and
- generating an authentication filter based on the input.

14. The one or more non-transitory computer readable media of claim 13, wherein the operations further comprise:
- storing the authentication filter for classification.

15. The one or more non-transitory computer readable media of claim 14, wherein a plurality of authentication filters are generated for an input; and wherein the operations further comprise:
- determining an average filter for the plurality of authentication filters; and
- storing the average filter for classification.

16. The one or more non-transitory computer readable media of claim 14, wherein the trained authentication model comprises:
- a first machine-learned model configured to process a plurality of physical signal samples to generate a device fingerprint for a device based at least in part on the plurality of physical signal samples; and
- a second machine-learned model configured to process the device fingerprint to generate the authentication classification for the device based at least in part on the device fingerprint.

17. The one or more non-transitory computer readable media of claim 14, wherein the operations further comprise:
- obtaining signal data, wherein the signal data is descriptive of a computing device;
- processing the signal data with an encoder model to generate encoded signal data;
- determining a signal authentication classification for the encoded signal data based on the authentication filter; and
- adjusting network access for the computing device based on the signal authentication classification.

18. The one or more non-transitory computer readable media of claim 13, wherein the trained authentication model comprises a trained classification model.

\* \* \* \* \*